US012444058B2

(12) United States Patent
Zhu et al.

(10) Patent No.: US 12,444,058 B2
(45) Date of Patent: Oct. 14, 2025

(54) FACIAL IMAGE PROCESSING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Feida Zhu, Shenzhen (CN); Junwei Zhu, Shenzhen (CN); Yun Cao, Shenzhen (CN); Ying Tai, Shenzhen (CN); Chengjie Wang, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 342 days.

(21) Appl. No.: 18/315,065

(22) Filed: May 10, 2023

(65) Prior Publication Data

US 2023/0281833 A1 Sep. 7, 2023

Related U.S. Application Data

(63) Continuation of application No. PCT/CN2022/103392, filed on Jul. 1, 2022.

(30) Foreign Application Priority Data

Aug. 10, 2021 (CN) .......................... 202110913421.3

(51) Int. Cl.
*G06T 7/246* (2017.01)
*G06V 10/77* (2022.01)
(Continued)

(52) U.S. Cl.
CPC .......... *G06T 7/246* (2017.01); *G06V 10/7715* (2022.01); *G06V 10/774* (2022.01);
(Continued)

(58) Field of Classification Search
CPC .......... G06T 7/246; G06T 2207/10016; G06T 2207/20081; G06T 2207/30201;
(Continued)

(56) References Cited

U.S. PATENT DOCUMENTS 10,529,113 B1 * 1/2020 Sheikh .................... G06F 3/011
10,636,193 B1 * 4/2020 Sheikh .................... G06V 20/20
(Continued)

FOREIGN PATENT DOCUMENTS

CN 111027465 A 4/2020
CN 111598977 A 8/2020
(Continued)

OTHER PUBLICATIONS

The World Intellectual Property Organization (WIPO) International Search Report for PCT/CN2022/103392 Sep. 21, 2022 14 Pages (including translation).

*Primary Examiner* — Wesley J Tucker
(74) *Attorney, Agent, or Firm* — ANOVA LAW GROUP, PLLC

(57) ABSTRACT

A facial image processing method includes: obtaining first optical flow information; obtaining, based on the first optical flow information, second optical flow information through an optical flow information prediction sub-model of an image processing model; generating, based on the first facial sample image and the second optical flow information, a predicted image of the first facial sample image through a generator of the image processing model; discriminating the predicted image and the second facial sample image through a discriminator of the image processing model to obtain a first discrimination result and a second discrimination result; and training the image processing model based on the first discrimination result, the second discrimination result, the predicted image, the second facial sample image, the first (Continued)

optical flow information, and the second optical flow information.

20 Claims, 11 Drawing Sheets

(51) Int. Cl.
  *G06V 10/774* (2022.01)
  *G06V 20/40* (2022.01)
  *G06V 40/16* (2022.01)
(52) U.S. Cl.
  CPC ............ *G06V 20/40* (2022.01); *G06V 40/174* (2022.01); *G06T 2207/10016* (2013.01); *G06T 2207/20081* (2013.01); *G06T 2207/30201* (2013.01)
(58) Field of Classification Search
  CPC .... G06T 3/00; G06V 10/7715; G06V 10/774; G06V 20/40; G06V 40/174; G06V 10/82; G06V 40/16; G06N 3/0464
  See application file for complete search history.

(56) References Cited

U.S. PATENT DOCUMENTS

| | | | | |
|---|---|---|---|---|
| 11,670,015 | B2* | 6/2023 | Liu | G06V 40/165 |
| | | | | 345/582 |
| 2018/0032828 | A1* | 2/2018 | Wang | G06V 40/166 |
| 2021/0241521 | A1* | 8/2021 | Zhe | G06N 3/047 |
| 2021/0312671 | A1* | 10/2021 | Liu | G06V 40/171 |
| 2022/0121841 | A1* | 4/2022 | Oh | G06F 18/22 |
| 2023/0061517 | A1* | 3/2023 | Yang | G06V 10/774 |
| 2024/0221308 | A1* | 7/2024 | Kopp | G16H 30/40 |
| 2024/0257554 | A1* | 8/2024 | Xu | G06N 3/084 |
| 2024/0289616 | A1* | 8/2024 | Leube | G06N 3/0464 |

FOREIGN PATENT DOCUMENTS

| | | |
|---|---|---|
| CN | 111783603 A | 10/2020 |
| CN | 111797753 A | 10/2020 |
| CN | 112733616 A | 4/2021 |
| CN | 112800869 A | 5/2021 |
| JP | 2000312336 A | 11/2000 |

\* cited by examiner

FACIAL IMAGE PROCESSING METHOD AND APPARATUS, DEVICE, AND STORAGE MEDIUM

CROSS-REFERENCES TO RELATED APPLICATIONS

This application is a continuation application of PCT Patent Application No. PCT/CN2022/103392, entitled "FACIAL IMAGE PROCESSING METHOD AND APPARATUS, AND DEVICE AND STORAGE MEDIUM" and filed on Jul. 1, 2022, which claims priority to Chinese Patent Application No. 202110913421.3, entitled "FACIAL IMAGE PROCESSING METHOD AND APPARATUS, DEVICE, AND STORAGE MEDIUM" filed on Aug. 10, 2021, the entire contents of both of which are incorporated herein by reference.

FIELD OF THE TECHNOLOGY

The present disclosure relates to the field of computer technologies, and in particular, to a facial image processing method and apparatus, a device, and a storage medium.

BACKGROUND OF THE DISCLOSURE

Currently, for the needs of entertainment, Internet applications provide gameplay such as face swap. In order to achieve the purpose of face swap, it is usually necessary to train an image processing model. The image processing model is generally trained with a large amount of facial image data of a target face and an original face, and the trained model may be used for replacing the original face in an image with the target face.

SUMMARY

Embodiments of the present disclosure provide a facial image processing method and apparatus, a device, and a storage medium. Through technical solutions provided by the embodiments of the present disclosure, the generated video has strong authenticity and the image processing effect of an image processing model is diversified. The technical solutions are as follows:

According to an aspect, a facial image processing method is provided, including: obtaining first optical flow information, the first optical flow information representing offsets of a plurality of key points of a target object in a first facial sample image and a second facial sample image; obtaining, based on the first optical flow information, second optical flow information through an optical flow information prediction sub-model of an image processing model, the second optical flow information representing offsets between a plurality of pixels in the first facial sample image and a plurality of corresponding pixels in the second facial sample image; generating, based on the first facial sample image and the second optical flow information, a predicted image of the first facial sample image through a generator of the image processing model; discriminating the predicted image and the second facial sample image through a discriminator of the image processing model to obtain a first discrimination result and a second discrimination result, the first discrimination result indicating whether the predicted image is a true sample image, and the second discrimination result indicating whether the second facial sample image is a true sample image; and training the image processing model based on the first discrimination result, the second discrimination result, the predicted image, the second facial sample image, the first optical flow information, and the second optical flow information.

According to an aspect, a facial image processing method is provided, including: obtaining a facial image and a first video, the facial image being a facial image of a first object, the first video including a plurality of facial images of a second object, and expression changes existing between the plurality of facial images; and processing the facial image and the first video through an image processing model to obtain a second video, the second video including a plurality of facial images of the first object, and expression changes between the plurality of facial images of the first object are the same as the expression changes between the plurality of facial images in the first video; the image processing model being obtained by adversarial training of a first facial sample image, a second facial sample image, and second optical flow information of a same target object, the second optical flow information representing offsets between a plurality of pixels in the first facial sample image and a plurality of corresponding pixels in the second facial sample image, the second optical flow information being determined based on first optical flow information, and the first optical flow information representing offsets of a plurality of key points of a face of the target object in the first facial sample image and the second facial sample image.

According to an aspect, a facial image processing apparatus is provided, including: a first optical flow obtaining module, configured to obtain first optical flow information, the first optical flow information representing offsets of a plurality of key points of a face of a target object in a first facial sample image and a second facial sample image; a second optical flow obtaining module, configured to obtain, based on the first optical flow information, second optical flow information through an optical flow information prediction sub-model of an image processing model, the second optical flow information representing offsets between a plurality of pixels in the first facial sample image and a plurality of corresponding pixels in the second facial sample image; a generation module, configured to generate, based on the first facial sample image and the second optical flow information, a predicted image of the first facial sample image through a generator of the image processing model; a discrimination module, configured to discriminate the predicted image and the second facial sample image through a discriminator of the image processing model to obtain a first discrimination result and a second discrimination result, the first discrimination result indicating whether the predicted image is a true sample image, and the second discrimination result indicating whether the second facial sample image is a true sample image; and a model training module, configured to train the image processing model based on the first discrimination result, the second discrimination result, the predicted image, the second facial sample image, the first optical flow information, and the second optical flow information.

According to an aspect, a facial image processing apparatus is provided, including: an obtaining module, configured to obtain a facial image and a first video, the facial image being a facial image of a first object, the first video including a plurality of facial images of a second object, and expression changes existing between the plurality of facial images; and an image processing module, configure to process the facial image and the first video through an image processing model to obtain a second video, the second video including a plurality of facial images of the first object, and expression changes between the plurality of facial images of the first object are the same as the expression changes between the plurality of facial images in the first video; the image processing model being obtained by adversarial training of a first facial sample image, a second facial sample image, and second optical flow information of a same target object, the second optical flow information representing offsets between a plurality of pixels in the first facial sample image and a plurality of corresponding pixels in the second facial sample image, the second optical flow information being determined based on first optical flow information, and the first optical flow information representing offsets of a plurality of key points of a face of the target object in the first facial sample image and the second facial sample image.

According to an aspect, a computer device is provided, including one or more processors and one or more memories, the one or more memories storing at least one computer program, and the computer program being loaded and executed by the one or more processors to implement the facial image processing method.

According to an aspect, a non-transitory computer-readable storage medium is provided, the a computer-readable storage medium storing at least one computer program, and the computer program being loaded and executed by a processor to implement the facial image processing method.

BRIEF DESCRIPTION OF THE DRAWINGS

To describe the technical solutions in embodiments of the present disclosure more clearly, the following briefly describes the accompanying drawings required for describing the embodiments.

DESCRIPTION OF EMBODIMENTS

Figure 1:
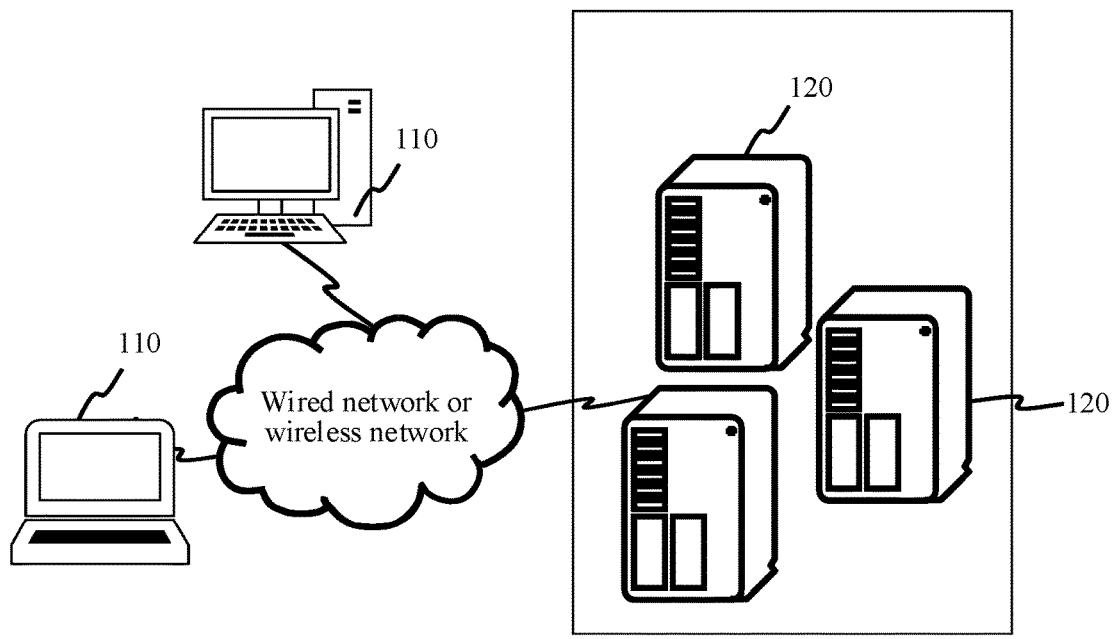
FIG. 1 is a schematic diagram of an implementation environment of a facial image processing method according to an embodiment of the present disclosure.

To make the objectives, technical solutions, and advantages of the present disclosure clearer, the following further describes implementations of the present disclosure in detail with reference to the accompanying drawings.

The terms "first", "second" and the like in the present disclosure are used to distinguish between same or similar terms having substantially the same functions or purposes. It is to be understood that "first", "second" and "nth" neither have a logical or sequential dependency relationship, nor limit the quantity and order of execution.

In the present disclosure, "at least one" refers to one or more, and "a plurality of" means two or more.

Artificial intelligence (AI) involves a theory, method, technology and application system that uses a digital computer or a machine controlled by the digital computer to simulate, extend, and expand human intelligence, perceive an environment, obtain knowledge, and use the knowledge to obtain an optimal result. AI technology is a comprehensive discipline that relates to a wide range of fields, including both hardware-level technologies and software-level technologies. Computer vision (CV) technology is a science that studies how to use a machine to "see", and further, refers to use a camera and a computer instead of human eyes to implement machine vision, such as recognition, tracking and measurement, of a target, and further perform graphic processing, so that the computer processes the target into an image more suitable for observation by human eyes or transmission to an instrument for detection.

Machine learning (ML) is a multi-field interdiscipline that relates to a plurality of disciplines such as probability theory, statistics, approximation theory, convex analysis, and algorithm complexity theory. ML specializes in studying how a computer simulates or implements a human learning behavior to obtain new knowledge or skills, and reorganize existing knowledge structures so that the computer continuously improves its performance.

Block chain is a new application mode of computer technology such as distributed data storage, point-to-point transmission, consensus mechanism, and encryption algorithm. Block chain is essentially a decentralized database, which is a string of data blocks associated with each other by using cryptographic methods, and each data block contains information of a batch of network transactions, which is used for verifying the validity (anti-counterfeiting) of information thereof and generating the next block. The block chain may include a block chain underlying platform, a platform product service layer, and an application service layer.

Portrait drive: given a to-be-driven facial image and a driving video, the driving video contains a series of expression postures, and purpose of portrait drive is to generate a video so that a face in the to-be-driven facial image makes expressions in the driving video.

Generator: trained by a generative adversarial network (GAN), which is composed of a generator and a discriminator. The input of a discrimination network is a real sample or the output of the generator, and the purpose thereof is to distinguish the output of a generation network from the real sample as much as possible. The generation network is to deceive the discrimination network as much as possible. The two networks are pitted against each other, constantly adjusting parameters, and eventually allowing the generator to generate fake pictures which seem real.

In the related art, since an image processing model can only swap two specific faces, but cannot provide other processing effects, the processing effect is single. Therefore, there is an urgent need for a facial image processing method with more diverse and realistic effects.

FIG. 1 is a schematic diagram of an implementation environment of a facial image processing method according to an embodiment of the present disclosure. Referring to FIG. 1, the implementation environment may include a terminal 110 and a server 120.

In some embodiments, the terminal 110 may be a tablet computer, a notebook computer, a desktop computer, or the like, but is not limited thereto. The terminal 110 runs an application program supporting image processing to process an image input or taken by a user.

In some embodiments, the server 120 is an independent physical server, or a server cluster or distributed system composed of a plurality of physical servers, or a cloud server that provides cloud services, cloud databases, cloud computing, cloud functions, cloud storage, network services, cloud communications, middleware services, domain name services, security services, content delivery network (CDN), and basic cloud computing services such as big data and artificial intelligence platforms.

The terminal 110 can communicate with the server 120 to use an image processing function provided by the server 120, for example, the terminal 110 may upload an image to the server 120, to process the image through the server 120, and return image processing results to the terminal 110. The facial image processing method provided in an embodiment of the present disclosure may be performed by a terminal or a server, and this is not limited in the embodiments of the present disclosure.

In some embodiments, the terminal 110 and the server 120 may act as nodes on a block chain system to store data related to image processing.

After introducing the implementation environment of the embodiment of the present disclosure, an application scenario of the embodiment of the present disclosure is introduced below in combination with the foregoing implementation environment. In the following description process, the facial image processing method provided by the embodiment of the present disclosure may be applied to a face-driven scenario. That is, through the facial image processing method provided by the embodiment of the present disclosure, when the terminal 110 obtains a to-be-driven face image and a driving video, a new video can be generated, and a face in the new video is the face in an original facial image. Expressions of the face change with changes of facial expressions in the driving video, that is, the expressions of the face in the new video are the same as the expressions of the face in the driving video. For example, a certain platform can provide some facial images of a star, a user may upload his/her own expression video on the platform, and the platform generates a dynamic video of the face of the star through the facial images and the expression video of the star.

In addition, the facial image processing method provided by the embodiment of the present disclosure may also be applied to other facial image processing scenarios, such as an animation production scenario and a game production scenario, and this is not limited in embodiments of the present disclosure.

In an embodiment of the present disclosure, the facial image processing method provided by the embodiment of the present disclosure may be implemented by a computer device through an image processing model. A training structure of the image processing model is briefly described below in conjunction with FIG. 2.

Figure 2:
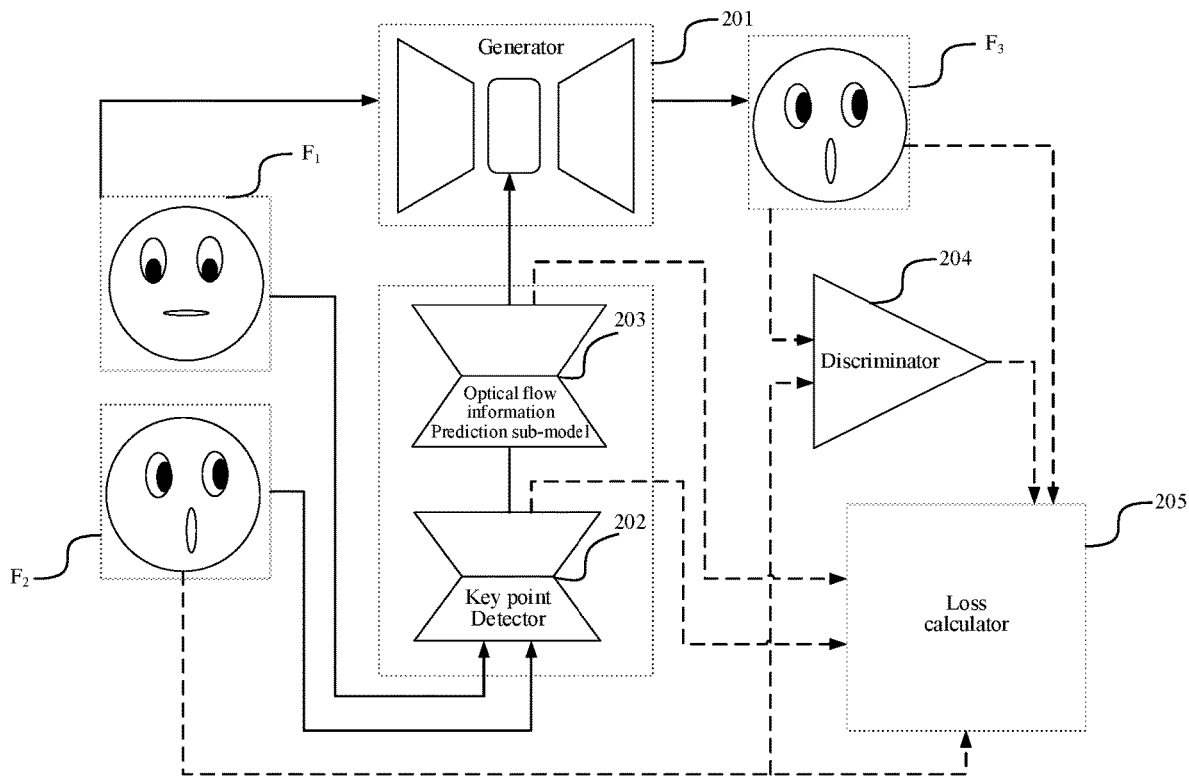
FIG. 2 is a schematic diagram of a training structure of a facial image processing model according to an embodiment of the present disclosure.

Referring to FIG. 2, FIG. 2 shows a training structure for an image processing model. The image processing model includes: a generator 201, a key point detector 202, an optical flow information prediction sub-model 203, a discriminator 204, and a loss calculator 205. The key point detector 202 is configured to detect key points of a first facial sample image $F_1$ and a second facial sample image $F_2$. A computer device obtains, based on the detected key points, first optical flow information between the first facial sample image $F_1$ and the second facial sample image $F_2$. The optical flow information prediction sub-model 203 is configured to make a prediction according to the first optical flow information, to obtain second optical flow information. The generator 201 is configured to process the first facial sample image $F_1$ according to the second optical flow information, to obtain a predicted image $F_3$. The discriminator 204 is configured to identify whether an input image is an image generated by the generator or a true sample image. The loss calculator 205 is configured to calculate a function value of a loss function based on a discrimination result of the discriminator 204, the predicted image $F_3$, the second facial sample image $F_2$, the first optical flow information and the second optical flow information, and update network parameters of the image processing model based on the function value of the loss function to perform the next training. After the training is completed, the image processing model including the generator 201, the key point detector 202 and the optical flow information prediction sub-model 203 may be published as a trained image processing model.

Figure 3:
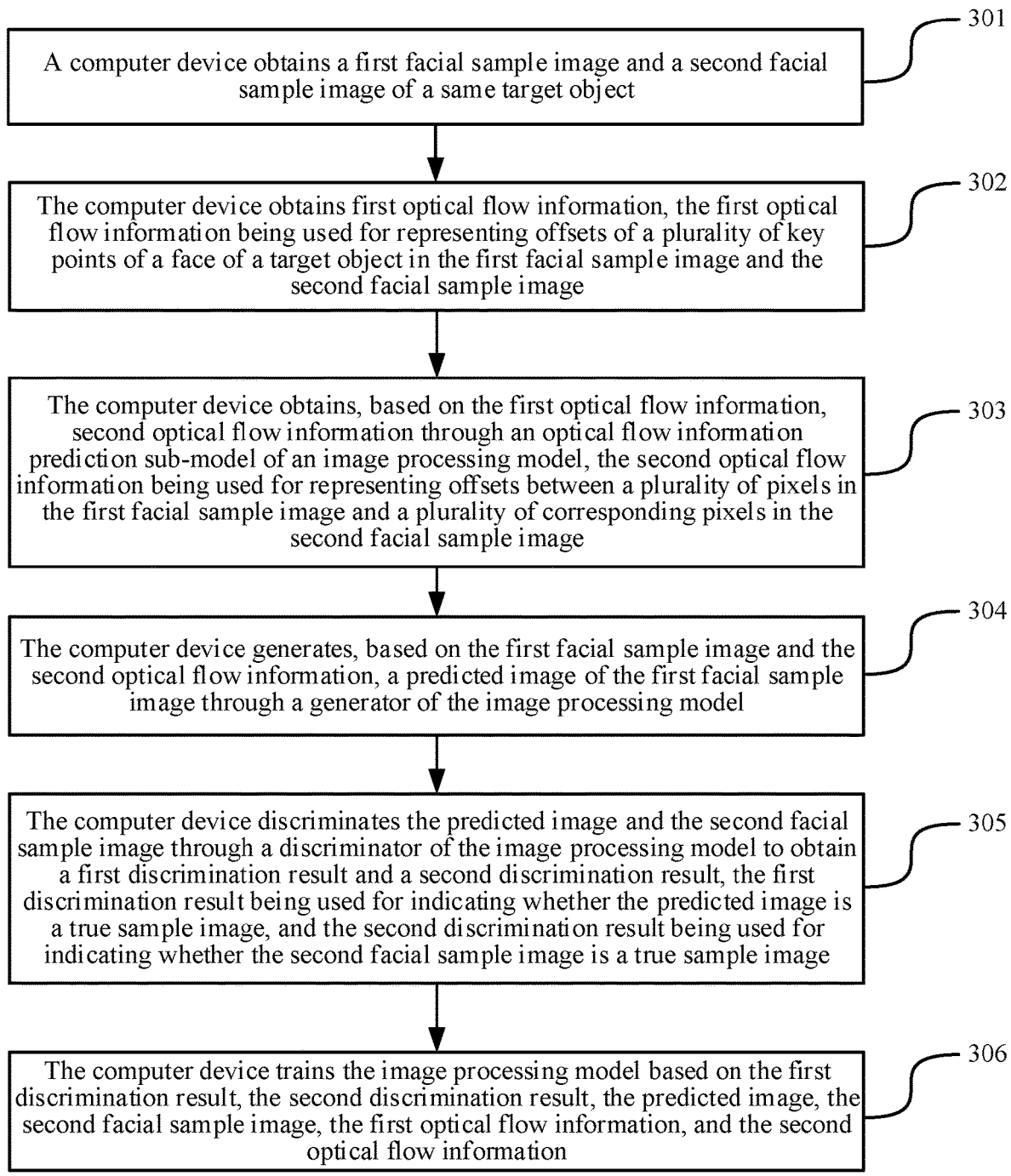
FIG. 3 is a flow chart of a facial image processing method according to an embodiment of the present disclosure.

The following describes a general training process, and the training process includes at least the following two parts: training of the discriminator and training of the generator and the optical flow information prediction sub-model. When training the discriminator, network parameters of the generator and the optical flow information prediction sub-model are kept unchanged. Network parameters of the discriminator are adjusted based on a sample image and a model processing result, and after being adjusted to satisfy a condition, the network parameters of the discriminator are kept unchanged. The network parameters of the generator and the optical flow information prediction sub-model are adjusted based on the sample image and the model processing result, and after the network parameters are adjusted to satisfy a condition, the discriminator is trained. Such alternate training enables the image processing model to learn the ability to drive an input image based on an input video. FIG. 3 is a flow chart of a facial image processing method according to an embodiment of the present disclosure. Taking the executive body being a computer device as example, referring to FIG. 3, the method includes:

301. A computer device obtains a first facial sample image and a second facial sample image of a same target object.

The first facial sample image and the second facial sample image are two facial sample images of the same target object in a same video. The target object may be a person, an animal, or a virtual image.

During any iteration, the computer device obtains a pair of sample images from a sample image set, that is, the first facial sample image and the second facial sample image. In some embodiments, the first facial sample image appears before the second facial sample image in a driving video. The driving video is a video for adjusting facial expressions. In some embodiments, a plurality of video frames of the driving video constitute the sample image set, and the driving video is also referred to as a sample video.

In some embodiments, a process of obtaining the sample image set includes the following steps. A computer device obtains a driving video, the driving video being a dynamic video of a target object, video frames of the driving video containing a face of the target object, and facial expressions of the target object in a plurality of video frames of the driving video are different. For example, the facial expressions of the target object in the driving video change over time. After obtaining the driving video, the computer device extract a plurality of images from the driving video, and adds the plurality of extracted images to a sample image set for model training.

In addition to the forgoing implementations, the computer device can also obtain a public image set from the network. The image set includes different facial images of a same target object, and the computer device may use the image set as the sample image set.

302. The computer device obtains first optical flow information, the first optical flow information representing offsets of a plurality of key points of a face of a target object in the first facial sample image and the second facial sample image.

The first optical flow information is optical flow information of key points of the facial sample images.

303. The computer device obtains, based on the first optical flow information, second optical flow information through an optical flow information prediction sub-model of an image processing model, the second optical flow information representing offsets between a plurality of pixels in the first facial sample image and a plurality of corresponding pixels in the second facial sample image.

The image processing model is configured to process an input image. A plurality of corresponding pixels in the second facial sample image refer to pixels present in both the first facial sample image and the second facial sample image. The second optical flow information is the optical flow information of a plurality of pixels of the facial sample image obtained through prediction. The optical flow information prediction sub-model can predict the optical flow information of the plurality of pixels in the facial sample image base on fewer pixels, that is, offsets of the plurality of pixels, and the plurality of key points are the foregoing fewer pixels. The optical flow information prediction sub-model may predict offsets of the plurality of pixels in the first facial sample image and the plurality of corresponding pixels on second facial sample image based on offsets of the plurality of key points in the first facial sample image and the second facial sample image.

304. The computer device generates, based on the first facial sample image and the second optical flow information, a predicted image of the first facial sample image through a generator of the image processing model.

The second optical flow information is offsets of a plurality of pixels in the first facial sample image. Therefore, based on the second optical flow information, an image of the pixels in the first facial sample image after offsetting may be predicted. A training goal of the generator is to make the generated predicted image and a second facial sample image have the same expression.

305. The computer device discriminates the predicted image and the second facial sample image through a discriminator of the image processing model to obtain a first discrimination result and a second discrimination result, the first discrimination result indicating whether the predicted image is a true sample image, and the second discrimination result indicating whether the second facial sample image is a true sample image.

306. The computer device trains the image processing model based on the first discrimination result, the second discrimination result, the predicted image, the second facial sample image, the first optical flow information, and the second optical flow information.

In an embodiment of the present disclosure, a function value of a total loss function is calculated through a loss calculator, network parameters of the image processing model are updated based on the function value of the total loss function, and the next iterative training is performed on the updated image processing model.

Through the technical solution provided by the embodiment of the present disclosure, the second optical flow information capable of representing pixel offsets in a facial image is determined based on a plurality of key points of a face of a target object in the first facial sample image and the second facial sample image, to implement generative adversarial training based on the second optical flow information and an input sample image. Therefore, the image processing model can learn relevant features of the expression of the facial image, to achieve the purpose of driving the facial image to change the expression. The image processing model may be configured to drive any face, achieving the purpose of diversified image processing effects.

Figure 4:
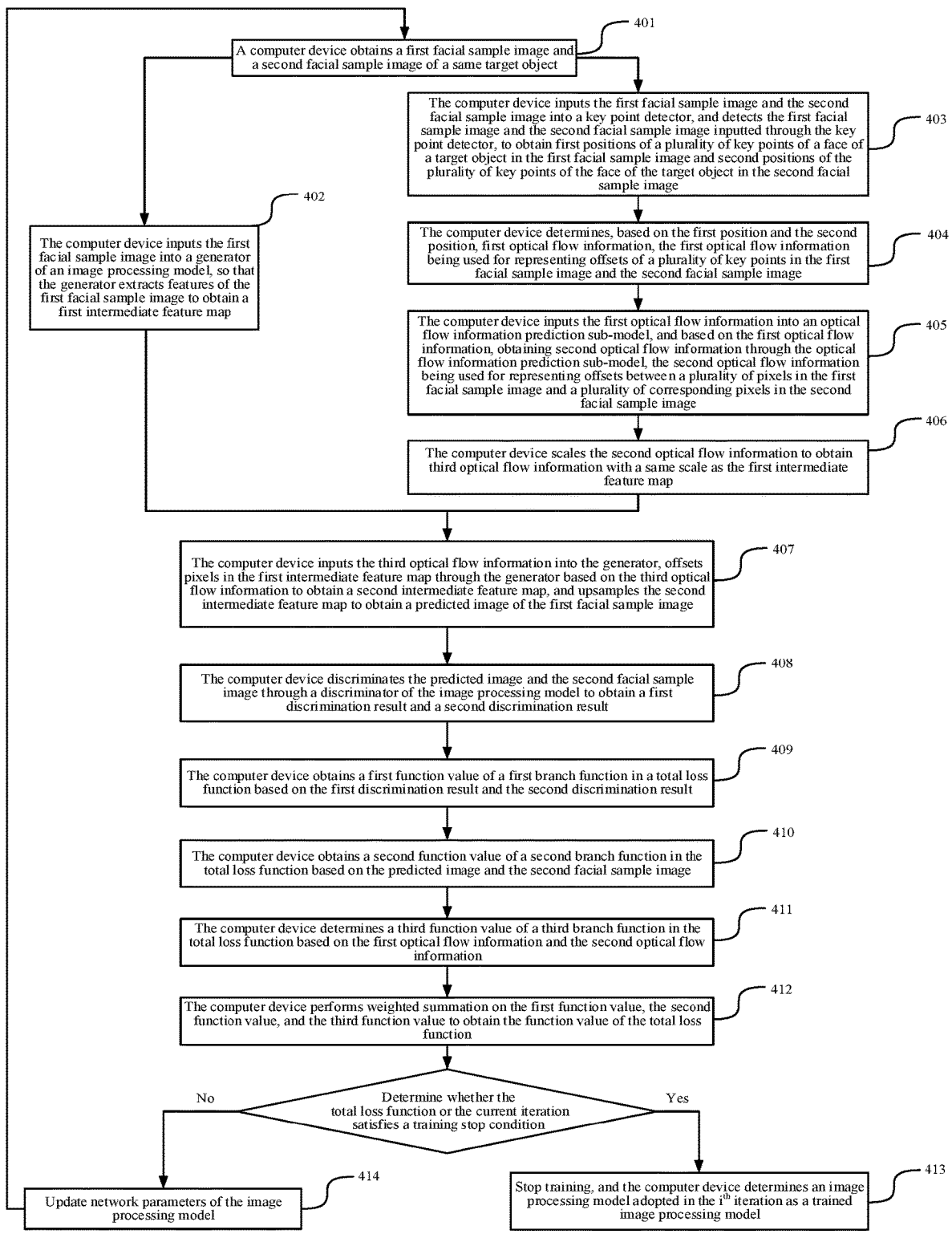
FIG. 4 is a flow chart of a facial image processing method according to an embodiment of the present disclosure.

A training process includes a plurality of iterations. The following illustrates the facial image processing method by only using an iteration process in the training process as an example. FIG. 4 is a flow chart of a facial image processing method according to an embodiment of the present disclosure. Taking the executive body being a computer device as an example, referring to FIG. 4, the method includes:

401. During $i^{th}$ iteration, a computer device obtains a first facial sample image and a second facial sample image of a same target object, and performs step 402 and step 403, the first facial sample image and the second facial sample image including a face of the target object, and i being a positive integer.

Step 401 and step 301 belong to the same inventive concept, and for the implementation process therefor, see the relevant description of step 301, and no repeated description is provided here.

402. The computer device inputs the first facial sample image into a generator of an image processing model, so that the generator extracts features of the first facial sample image to obtain a first intermediate feature map, and performs step 407.

In some embodiments, the generator includes at least one convolution layer. The generator convolves the first facial sample image through the at least one convolution layer to obtain the first intermediate feature map. When the generator includes one convolution layer, the first facial sample image is convolved through the convolution layer to obtain the first intermediate feature map. When the generator includes more than two convolution layers, for any convolution layer, the convolution layer convolves an input image or a feature map, and inputs a convolution result into the next convolution layer, and so on, the last convolution layer outputs the first intermediate feature map. In some embodiments, the generator further includes a pooling layer for pooling a feature map output by the convolution layer to obtain the first intermediate feature map, so as to avoid gradient explosion. In some embodiments, the generator is the generator of a generative adversarial network.

In some embodiments, the structure of the generator may further include other structures in addition to the convolution layer according to the foregoing embodiment. For example, the generator includes at least one fully connected layer. The generator fully connects the first facial sample image through the at least one fully connected layer to obtain the first intermediate feature map. Alternatively, the generator includes an attention encoding layer. The generator encodes the first facial sample image through the attention encoding layer based on an attention mechanism, to obtain the first intermediate feature map. Certainly, in addition to the foregoing feature extraction, the generator can also be designed based on other image feature extraction principles, and this is not limited in embodiments of the present disclosure.

403. The computer device inputs the first facial sample image and the second facial sample image into a key point detector, and detects the inputted first facial sample image and second facial sample image through the key point detector, to obtain first positions of a plurality of key points of a face of a target object in the first facial sample image and second positions of the plurality of key points in the second facial sample image.

In some embodiments, the key point detector detects positions of the key points in a facial sample image. The key point detector pre-stores semantic features of a plurality of key points, and respectively determine the positions of the plurality of key points, that is, the first positions and the second positions, in the first facial sample image and the second facial sample image based on the semantic features of the plurality of key points. The semantic features are used for representing characteristics of the key points, for example, which one of the five sense organs the key points belong to, an approximate position area, relationship with surrounding pixels, and the like.

The following uses the detection process of a key point as an example for illustration. The semantic feature of the key point is that the grayscale value thereof is significantly higher than those of the surrounding pixels, and the surrounding pixels refer to pixels within a 3×3 matrix area centered on the key point. The grayscale value matrix of the facial sample image is $$\begin{pmatrix} 10 & 15 & 30 & 42 & 67 \\ 38 & 200 & 68 & 64 & 32 \\ 65 & 28 & 34 & 43 & 63 \\ 44 & 123 & 43 & 67 & 46 \\ 86 & 156 & 145 & 34 & 65 \end{pmatrix},$$

the grayscale value matrix is traversed based on the semantic feature of the key point to find a pixel that best matches the semantic feature, and in the foregoing example, the pixel corresponding to the second row and the second column in the grayscale value matrix is the key point. The process is only an example of detecting the key point, and this is not limited in embodiments of the present disclosure. In some embodiments, the key point detection model can output 256 key points.

In addition to the foregoing implementation, the key point detector may further determine a key point through heatmap regression or coordinate regression, and this is not limited in embodiments of the present disclosure.

When the key point detector determines key point detection through the heatmap regression, taking determining key points on the first facial sample image as an example, the key point detector performs multiple rounds of downsampling on the first facial sample image to obtain a plurality of downsampled images of the first facial sample image. The process of the multiple rounds of downsampling corresponds to different downsampling accuracy, and the downsampling process may be regarded as a feature extraction process. The key point detector fuses the plurality of downsampling images to obtain a fused downsampled image of the first facial sample image. The key point detector performs multiple rounds of upsampling on the fused downsampled image to output a key point distribution map of the first facial sample image. The value of a pixel in the key point distribution map is used for representing probability that corresponding position is a key point, and the size of the key point distribution map is the same as that of the first facial sample image. The computer device determines, based on the key point distribution map, the plurality of key points in the first facial sample image.

404. The computer device determines first optical flow information based on the first positions and the second positions, the first optical flow information representing offsets of a plurality of key points in the first facial sample image and the second facial sample image.

For each key point in the first facial sample image, the second position of the key point in the second facial sample image is determined, and the second position of the key point is subtracted from the first position of the key point to obtain offset of the key point. The offset is used for indicating an offset direction and an offset amount. The first position and the second position are represented by coordinates in a same coordinate system, and the offset is represented in a vector form. For example, the pixel coordinates of the key point on the first facial sample image are (1, 2), the pixel coordinates of the key point on the second facial sample image are (2, 3), and the offset of the key point is a vector (1, 1). In some embodiments, key points output by the key point detector have identifiers, and the key points determined in different images have the same identifiers. The computer device can determine key points corresponding to the first facial sample image in the second facial sample image base on the identifiers of the plurality of key points in the first facial sample image and the identifiers of the plurality of key points in the second facial sample image.

In some embodiments, the first optical flow information is represented by a matrix, and when the offset is represented in a vector form, the matrix includes a plurality of vectors (which may also be regarded as coordinates). Each vector corresponds to one key point, and the vector is used for representing an offset direction and offset amount of the key point.

405. The computer device inputs the first optical flow information into an optical flow information prediction sub-model, and obtains second optical flow information through the optical flow information prediction sub-model based on the first optical flow information, the second optical flow information representing offsets between a plurality of pixels in the first facial sample image and a plurality of corresponding pixels in the second facial sample image.

In an embodiment of the present disclosure, the obtaining second optical flow information through the optical flow information prediction sub-model based on the first optical flow information includes: processing the first optical flow information through the optical flow information prediction sub-model of an image processing model to obtain the second optical flow information. The scale of the second optical flow information is the same as the scale of the first facial sample image.

In a possible embodiment, the computer device inputs the first facial sample image, the second facial sample image, and the first optical flow information into the optical flow information prediction sub-model, and the optical flow information prediction sub-model determines, based on the first optical flow information, offsets of a plurality of pixels in the first facial sample image on the second facial sample image, and the offsets are also the second optical flow information.

Figure 7:
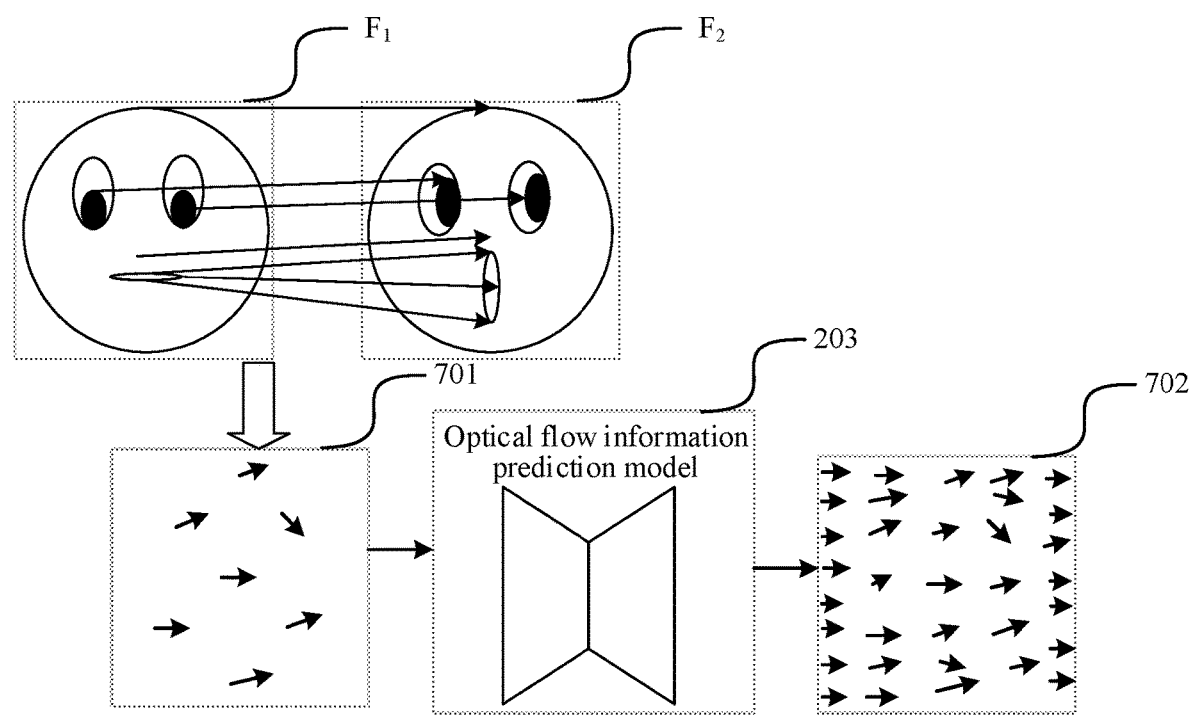
FIG. 7 is a schematic diagram of a process of obtaining second optical flow information according to an embodiment of the present disclosure.

The following illustrates the process of generating the second optical flow information according to FIG. 7: FIG. 7 includes a first facial sample image $F_1$, a second facial sample image $F_2$, first optical flow information 701, an optical flow information prediction sub-model 203, and second optical flow information 702. Each arrow in the first optical flow information 701 is used for representing offset of each key point. The first optical flow information 701 is input into the optical flow information prediction sub-model 203, the optical flow information prediction sub-model 203 outputs the second optical flow information 702 based on the first optical flow information 701, and each arrow in the first optical flow information 701 is used for representing the offset of each pixel. The number of pixels in the second optical flow information 702 is significantly greater than the number of pixels in the first optical flow information 701, that is, the process may be understood as an estimation process of a dense motion field.

In some embodiments, the second optical flow information is used for representing offsets of a plurality of pixels of the first facial sample image in the second facial sample image. The first optical flow information is used for representing offsets of a plurality of key points of the first facial sample image in the second facial sample image. The number of the plurality of pixels in the first facial sample image is greater than the number of the plurality of key points, so that the first optical flow information may be referred to as sparse motion field estimation, and the second optical flow information may be referred to as a dense motion field estimation. Accordingly, the optical flow information prediction sub-model is also referred to as a dense motion field estimation sub-model.

406. The computer device scales the second optical flow information to obtain third optical flow information with a same scale as the first intermediate feature map.

The second optical flow information includes optical flow information of a plurality of pixels in the first facial sample image, so that scale of the second optical flow information is the same as the scale of the first facial sample image. Moreover, the first intermediate feature map is obtained through feature extraction on the first facial sample image, so that the scale of the first intermediate feature map is different from the scale of the first facial sample image. Therefore, the second optical flow information needs to be processed first to obtain the third optical flow information with the same scale as the first intermediate feature map, and the first intermediate feature map is then processed based on the third optical flow information. In some embodiments, the second optical flow information and the first intermediate feature map are both in a matrix form.

In some embodiments, processing the second optical flow information to obtain the third optical flow information includes: scaling down the second optical flow information based on a scale difference between the first intermediate feature map and the first facial sample image to obtain the third optical flow information. In some embodiments, the computer device determines the scale difference between the first intermediate feature map and the first facial sample image, for example, determines a scale proportion, and performs equal proportion reduction on the second optical flow information based on the scale difference. The equal proportion reduction refers to performing equal proportion reduction on the offsets of the pixels in the second optical flow information to obtain the third optical flow information. In the foregoing process of scaling down, an offset direction of the pixels remains unchanged, that is, offset distances are reduced in equal proportion.

For example, if the second optical flow information is a 6×6 matrix and the first intermediate feature map is a 3×3 matrix, for a pixel with an offset of (−6, 10) in the second optical flow information, the scale proportion thereof is 2, and the offset of the pixel is (−3, 5) after equal proportion reduction.

407. The computer device inputs the third optical flow information into the generator, offsets pixels in the first intermediate feature map through the generator based on the third optical flow information to obtain a second intermediate feature map, and upsamples the second intermediate feature map to obtain a predicted image of the first facial sample image.

In some embodiments, taking a pixel $P_i$ in the first intermediate feature map as an example, a process of offsetting the pixels in the first intermediate feature map based on the third optical flow information includes: on the premise that when the position coordinates of the pixel $P_i$ in the first intermediate feature map are $(x_i, y_i)$, and an offset of the pixel is $(m_i, n_i)$, if the pixel $P_i$ is offset, the position coordinates of the offset pixel are $(x_1+m_i, y_i+n_i)$, offsetting a plurality of pixels in the first intermediate feature map in this way to obtain the second intermediate feature map. Offsetting the plurality of pixels in the first intermediate feature map is adjusting the positions of the plurality of pixels in the first intermediate feature map.

Figure 8:
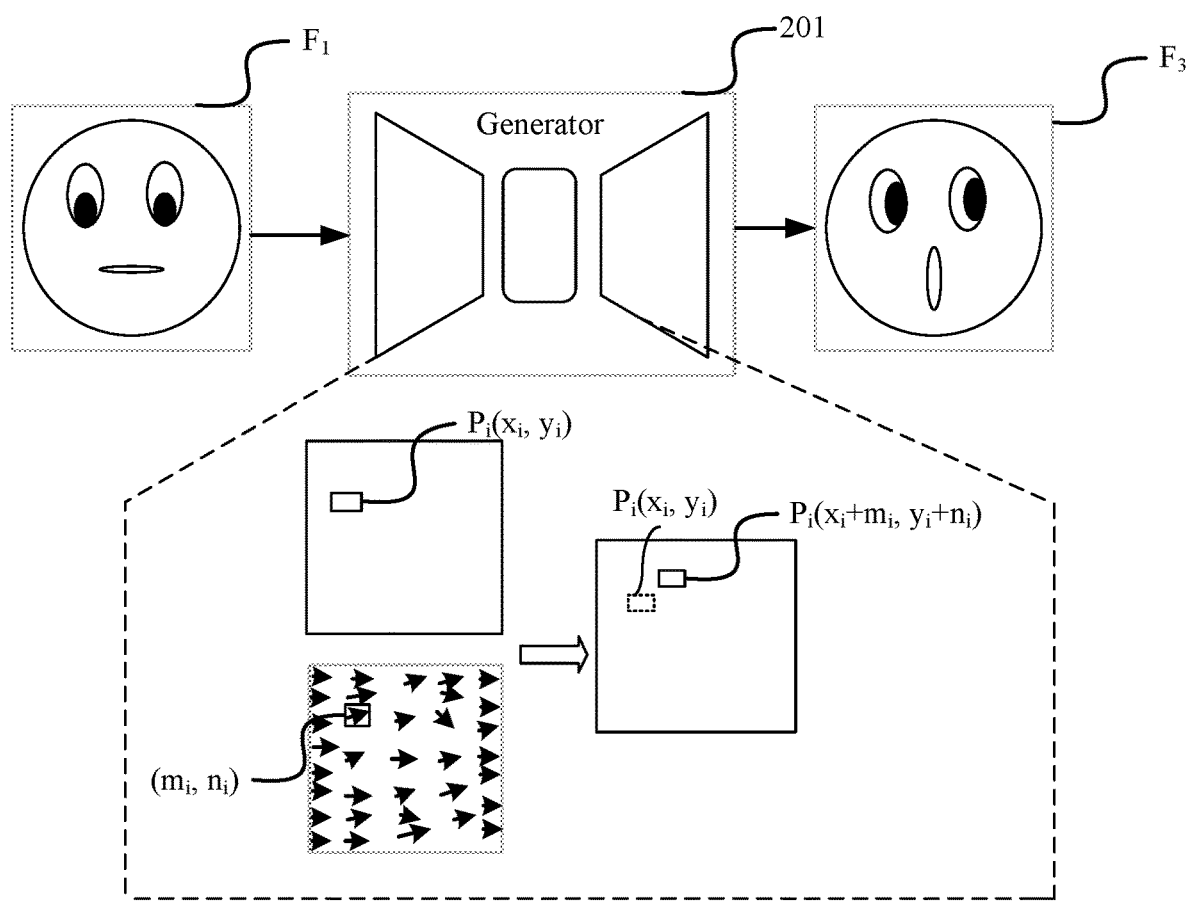
FIG. 8 is a schematic diagram of a generation process of a second intermediate feature map according to an embodiment of the present disclosure.

FIG. 8 is a schematic diagram of a process of offsetting pixels in the first intermediate feature map based on the third optical flow information by taking pixel $P_i$ in the first intermediate feature map as an example.

In some embodiments, the generator includes at least one transposed convolution layer. Accordingly, upsampling the second intermediate feature map to obtain the predicted image of the first facial sample image includes: the generator performs transposed convolution on the first facial sample image through the at least one transposed convolution layer to obtain the predicted image of the first facial sample image. If the generator includes one transposed convolution layer, transposed convolution is performed on the second intermediate feature map through the transposed convolution layer to obtain the predicted image. If the generator includes more than two transposed convolution layers, for any transposed convolution layer, the transposed convolution layer performs transposed convolution on an input feature map, and inputs a transposed convolution result to the next transposed convolution layer, and so on, the predicted image is output by the last transposed convolution layer. In some embodiments, the transposed convolution layer may also be an interpolation layer, that is, bilinear interpolation is performed on the second intermediate feature map to obtain the predicted image. In some embodiments, the generator further includes a feature concatenation layer and a convolution layer. The feature concatenation layer is used for performing feature concatenation on the result output by the transposed convolution layer, and inputting a feature concatenation result to the convolution layer. The convolution layer convolves the input feature concatenation result to obtain the predicted image.

In some embodiments, the generator adopts a U-Net architecture. The U-Net architecture is divided into an encoder part and a decoder part. The encoder part is configured to obtain the second intermediate feature map, and the decoder part is configured to obtain the predicted image.

The following illustrate an image processing flow of the generator by taking a generator that adopts a U-Net architecture as an example: inputting the first facial sample image to the generator, convolving the first facial sample image through the encoder of the generator to obtain the first intermediate feature map, generating the second intermediate feature map based on the third optical flow information and the first intermediate feature map, and performing operations, such as transposed convolution, cropping and feature concatenation, on the second intermediate feature map based on the decoder to output the predicted image.

408. The computer device discriminates the predicted image and the second facial sample image through a discriminator of the image processing model to obtain a first discrimination result and a second discrimination result, the first discrimination result indicating whether the predicted image is a true sample image, and the second discrimination result indicating whether the second facial sample image is a true sample image.

In an embodiment of the present disclosure, the discriminator is configured to identify whether an input image is an image generated by the generator or a true sample image.

In some embodiments, a discrimination result output by the discriminator is represented a score. The value range of the score is (0, 1), and the higher the score is, the more realistic the input image is, and the lower the fraction is, the less realistic the input image is, that is, the more likely the input image is generated by the generator. The true sample image refers to an image of the computer device that has not been processed by the generator. In some embodiments, the discriminator includes a convolution layer, a fully connected layer and a normalization layer. Taking processing the predicted image as an example, the predicted image is input into the discriminator and convolved by the convolution layer of the discriminator, and then the predicted image is convolved to obtain a feature map of the predicted image. The feature map of the predicted image is input into the fully connected layer of the discriminator, and is fully connected through the fully connected layer of the discriminator to obtain a classification map of the predicted image. The classification map of the predicted image is input into the normalization layer of the discriminator, and is normalized through the normalization layer of the discriminator to obtain a score of the predicted image. In some embodiments, the discriminator is a discriminator of a generative adversarial network.

409. The computer device obtains a first function value of a first branch function in a total loss function based on the first discrimination result and the second discrimination result, the first branch function representing discrimination accuracy of the discriminator for an input image.

In adversarial training, the discriminator is configured to detect authenticity of an image generated by the generator, so that the generator has an ability to generate an image similar to a true sample image. The first branch function is constructed based on the discrimination accuracy of the discriminator for the predicted image, the discrimination accuracy of a reference image, and the generation accuracy of the generator.

In an embodiment of the present disclosure, the first branch function is expressed by the following formula (1):

$$L_{GAN} = \min_{G}\max_{D}[E[\log(D(F_i))] + E[\log(1 - D(G(F_j)))]] \quad (1)$$

$L_{GAN}$ represents a first function value of the first branch function; $F_i$ represents a first facial sample image; $F_j$ represents a second facial sample image; $G(F_i)$ represents the predicted image; $D(G(F_i))$ represents the first discrimination result; $D(F_j)$ represents the second discrimination result; log represents a logarithmic function for calculating the discrimination results; E represents expectation of calculating the discrimination results, which can reflect the average value of the discrimination results; and $$\min_{G}\max_{D}$$

represents that in a training process of the generative adversarial network, the discriminator is trained first, and the generator is then trained in addition, the purpose of training the discriminator is to maximize the first function value, and the larger the first function value is, the higher the discrimination accuracy of the discriminator for the input result is, that is, the stronger the ability to identify whether the image is a true sample image or an image generated by the generator is. The goal of training the generator is to minimize the first function value. The smaller the first function value is, the more similar the image generated by the generator is to the true sample image.

410. The computer device obtains a second function value of a second branch function in the total loss function based on the predicted image and the second facial sample image, the second branch function representing a difference between the predicted image and the second facial sample image.

To know accuracy of the predicted image generated by the generator, the second branch function is constructed based on the difference between the predicted image and the second facial sample image serving as the reference image. The smaller the second function value of the second branch function is, the smaller the difference between the predicted image and the second facial sample image is, that is, the stronger the ability of the generator to generate an image similar to a true sample image is.

In an embodiment of the present disclosure, the second branch function is expressed by the following formula (2):

$$L_{LPIPS}=[LPIPS(G(F_i))-LPIPS(F_j)]^2 \quad (2)$$

$LPIPS(F_j)$ represents the result of calculating image perceptual similarity of the second facial sample image, and $LPIPS(G(F_i))$ represents the result of calculating image perceptual similarity of the predicted image. The second branch function may indicate a loss corresponding to learned perceptual image patch similarity (LPIPS).

411. The computer device determines a third function value of a third branch function in the total loss function based on the first optical flow information and the second optical flow information, the third branch function representing prediction accuracy of the plurality of key points.

The optical flow information prediction sub-model predicts optical flow information of the plurality of pixels of the first facial sample image, that is, the second optical flow information, based on the first optical flow information. Because the second optical flow information includes the optical flow information of the plurality of key points, it is possible to determine whether a prediction result of the optical flow information prediction sub-model is accurate by determining a difference between the plurality of key points in the second optical flow information and the first optical flow information. Therefore, the third branch function is constructed based on the first optical flow information and the second optical flow information. The smaller the third function value is, the smaller the difference between the prediction result and the first optical flow information is, that is, the stronger the prediction ability of the optical flow information prediction sub-model is.

In an embodiment of the present disclosure, the third branch function is expressed by the following formula (3):

$$L_{motion} = \sum_{i=1}^{n}(M_{pi} - N_{pi})^2 \quad (3)$$

n represents the number of the key points in the first optical flow information, and n is a positive integer; pi represents the position of a key point, and i is a positive integer less than n; $M_{pi}$ represents the optical flow information of the $i^{th}$ key point in the first optical flow information; and $N_{pi}$ represents the optical flow information of the $i^{th}$ key point in the second optical flow information. For example, in a motion field N output by the dense motion field estimation sub-model of the generator, there can be 256 key points (n=256) whose offset amounts are known ground truth, the positions of the 256 key points are represented by $\{p_i|i=1,2,\ldots,256\}$, their actual offset amount are $\{M_{p_i}|i=1, 2,\ldots,256\}$, the loss corresponding to key point offset can then be calculated using formula (3).

412. The computer device performs weighted summation on the first function value, the second function value, and the third function value to obtain the function value of the total loss function.

A training process of the image processing model includes training of the generator, the discriminator and the optical flow information prediction sub-model. The three branch functions of the total loss function may reflect the training situations of the three parts, and network parameters of the image processing model are updated based on the total loss function.

In an embodiment of the present disclosure, the total loss function is expressed by the following formula (4):

$$L = L_{GAN} + \alpha * L_{LPIPS} + \beta * L_{motion} \quad (4)$$

α represents a weight of the second branch function, and β represents a weight of the third branch function. In some embodiments, the specific values of the two are α=50, β=100.

413. When a total loss function value of the $i^{th}$ iteration or the present iteration satisfies a training stop condition, stop training, and the computer device determines an image processing model adopted in the $i^{th}$ iteration as a trained image processing model.

The training stop condition includes: the total loss function value converges or the number of iterations reaches a threshold, and this is not limited in embodiments of the present disclosure.

414. When the total loss function value of the $i^{th}$ iteration or the present iteration does not satisfy the training stop condition, update network parameters of the image processing model, and perform $(i+1)^{th}$ iterative training based on the updated image processing model. For example, the loss can be fed back to the generator as back propagation, and gradient descend method can be used to update parameter values of the generator (e.g., parameters of the dense motion field estimation sub-model and parameters of image generation sub-model of the generator).

In the foregoing training process, taking the current $(i+1)^{th}$ iteration being to train the discriminator as an example, when the function value of the total loss function of the $i^{th}$ iteration or the present iteration does not satisfy the training stop condition, and the first function value of the first branch function does not satisfy a first condition, network parameters of the generator and the optical flow information prediction sub-model are remained unchanged, and network parameters of the discriminator in the image processing model are updated. When the $(i+1)^{th}$ iterative training is performed based on the updated network parameters of the discriminator until the first function value of the first branch function obtained through the $j^{th}$ iterative training satisfies the first condition, a training object is switched. Starting from $(j+1)^{th}$ iterative training, the network parameters of the discriminator are remained unchanged, and the network parameters of the generator and the optical flow information prediction sub-model are updated. If the first function value of the first branch function obtained by through the $(j+1)^{th}$ iterative training does not satisfy a second condition, the generator and the optical flow information prediction sub-model continue to be trained. When the first function value of the first branch function obtained through the $k^{th}$ iterative training satisfies the second condition, the training object is switched again. Starting from $(k+1)^{th}$ iterative training, the discriminator continues to be trained, and the training object is switched multiple times in this way to achieve the purpose of adversarial training, until the function value of the total loss function or the current iteration satisfies the training stop condition, the training is stopped. i, j, and k are positive integers, and i<j<k.

In some embodiments, the image processing model further includes an image enhancement sub-model. The computer device inputs the predicted image into the image enhancement sub-model, so that the predicted image is processed by the image enhancement sub-model to obtain an enhanced image with a higher resolution than the predicted image. The computer device may obtain the second function value of the second branch function of the total loss function based on the enhanced image and the predicted image, obtain the total loss function value based on the second function value, the first function value and the third function value, and train the image processing model based on the total loss function value. Performing training based on an image enhanced by the image enhancement sub-model may enable the image processing model to output a high-quality image, such as, a high-definition image, thereby improving the processing capability of the image processing model. In some embodiments, the image enhancement sub-model is a super-resolution model.

Through the technical solution provided by the embodiment of the present disclosure, the second optical flow information capable of representing pixel offsets in a facial image is determined based on a plurality of key points of a face of a target object in the first facial sample image and the second facial sample image, to implement generative adversarial training based on the second optical flow information and an input sample image. Therefore, the image processing model can learn relevant features of the expression of the facial image, to achieve the purpose of driving the facial image to change the expression. The image processing model may be configured to drive any face, achieving the purpose of diversified image processing effects.

Figure 5:
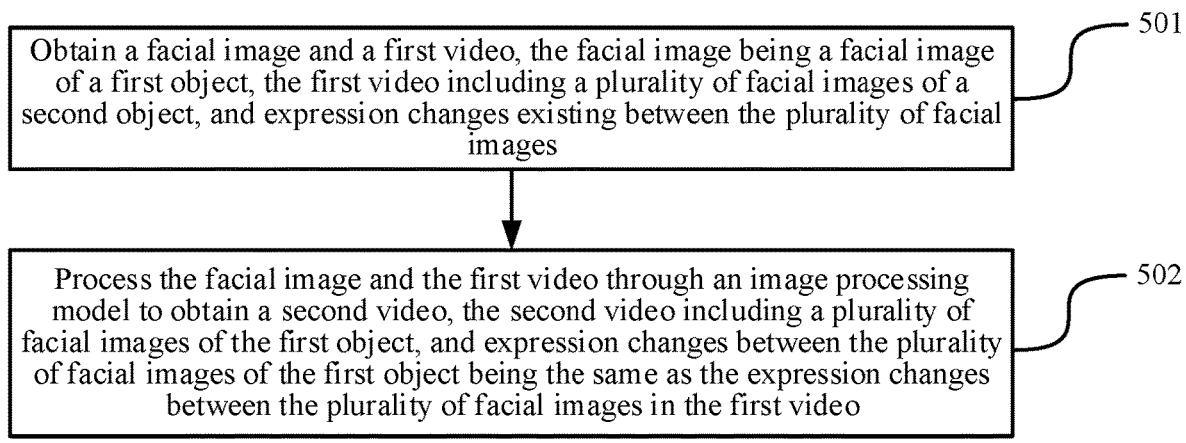
FIG. 5 is a flow chart of a facial image processing method according to an embodiment of the present disclosure.

FIG. 5 is a flow chart of a facial image processing method according to an embodiment of the present disclosure. Taking then executive body being a computer device as example, referring to FIG. 5, the method includes:

501. A computer device obtains a facial image and a first video, the facial image being a facial image of a first object, the first video including a plurality of facial images of a second object, and expression changes existing between the plurality of facial images.

The first video is the driving video, and is used for driving the facial image.

502. The computer device processes the facial image and the first video through an image processing model to obtain a second video, the second video including a plurality of facial images of the first object, and expression changes between the plurality of facial images of the first object being the same as the expression changes between the plurality of facial images in the first video.

The image processing model is obtained by adversarial training of a first facial sample image, a second facial sample image, and second optical flow information of a same target object. The second optical flow information is used for representing offsets between a plurality of pixels in the first facial sample image and a plurality of corresponding pixels in the second facial sample image, and the second optical flow information is determined based on first optical flow information. The first optical flow information is used for representing offsets of a plurality of key points of a face of the target object in the first facial sample image and the second facial sample image.

The process of processing the facial image by the image processing model includes: obtaining a first facial image from the first video based on the facial image; obtaining a second facial image based on the first facial image; obtaining a plurality of key points in the first facial image and the second facial image through a key point detector of the image processing model; obtaining first optical flow information based on the plurality of key points; obtaining second optical flow information through an optical flow information prediction sub-model of the image processing model based on the first optical flow information; and generating a predicted image through a generator of the image processing model based on the second optical flow information and the facial image.

The computer device processes a to-be-processed facial image based on a plurality of facial images in the first video to obtain a plurality of predicted images, and generates a second video based on the plurality of predicted images.

In some embodiments, image enhancement is performed on the plurality of predicted images obtained, and the second video is generated based on the predicted images subjected to image enhancement.

A processing process of the image processing model and a processing process of the key point detector, the optical flow information prediction sub-model, and the generator in the foregoing embodiment belong to a same inventive concept, and no repeated description is provided here.

Figure 6:
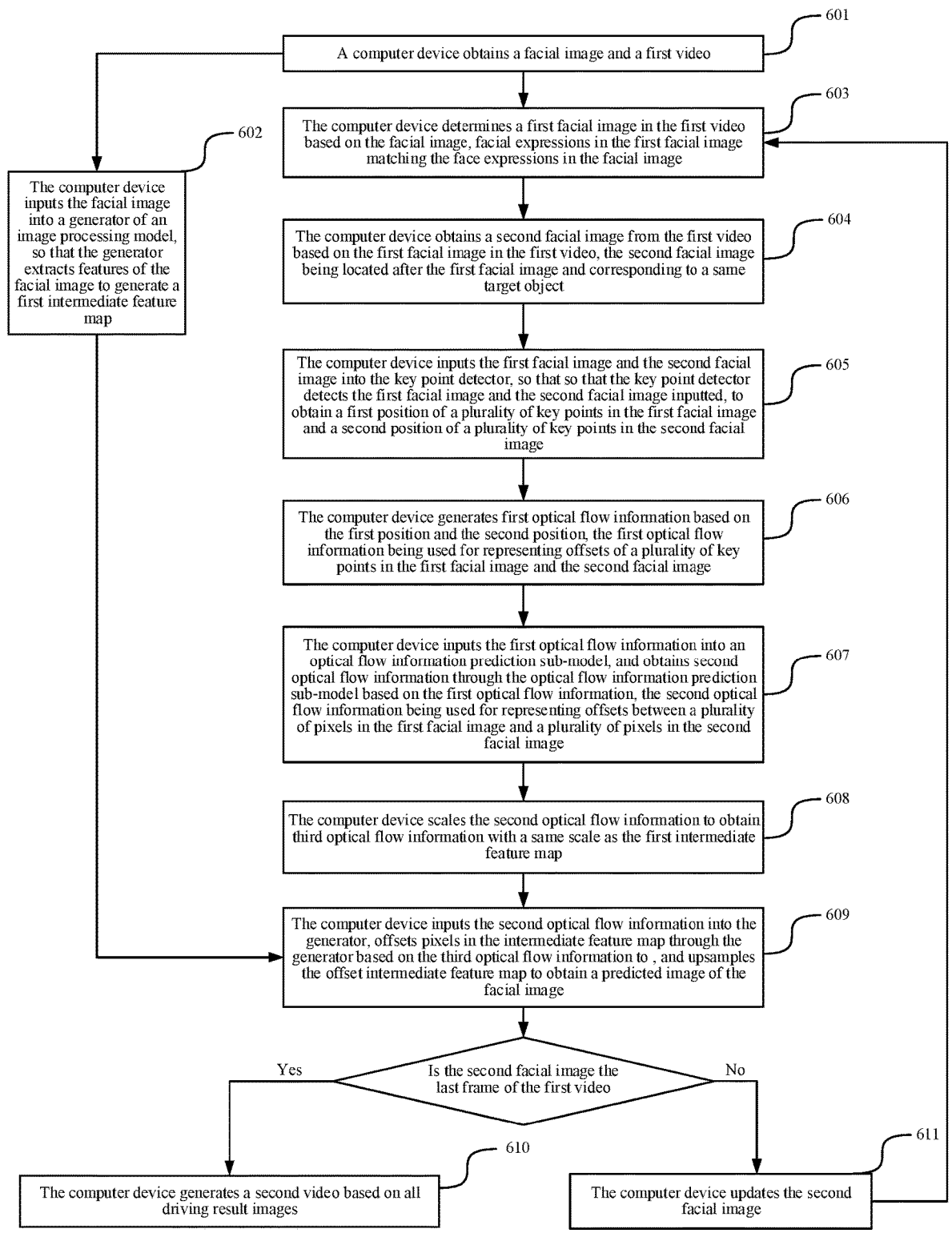
FIG. 6 is a flow chart of a facial image processing method according to an embodiment of the present disclosure.

After introducing the brief process of image processing, the following illustrates the facial image processing method by taking an image processing process as an example. FIG. 6 is a flow chart of a facial image processing method according to an embodiment of the present disclosure. Taking the executive body being a computer device as an example, referring to FIG. 6, the method includes:

601. A computer device obtains a facial image and a first video, and performs step 602 and step 603.

602. The computer device inputs the facial image into a generator of the image processing model, the generator extracting features of the facial image to generate a first intermediate feature map, and performs step 609.

Step 602 and step 402 belong to the same inventive concept, and no repeated description is provided here.

603. The computer device determines a first facial image in the first video based on the facial image, facial expressions in the first facial image matching the facial expressions in the facial image.

In some embodiments, key point detection is performed on the facial image and a plurality of images in the first video through a key point detector to obtain the key points of the facial image and the plurality of images in the first video. The key points of the facial image are matched one by one with the key points of the plurality of images in the first video to find an image with the highest similarity with the key points of the facial image in the first video as the first facial image matching the facial image.

604. The computer device obtains a second facial image from the first video based on the first facial image in the first video, the second facial image being located after the first facial image and corresponding to a same target object.

In an embodiment of the present disclosure, based on the timestamp or image number of the first facial image, a second facial image with a timestamp or image number located after that of the first facial image is obtained in the first video.

605. The computer device inputs the first facial image and the second facial image into the key point detector, so that the key point detector detects the first facial image and the second facial image inputted, to obtain first positions of a plurality of key points in the first facial image and second positions of a plurality of key points in the second facial image.

Step 605 and step 403 belong to the same inventive concept, and no repeated description is provided here. In some embodiments, the key points of the first facial image has been obtained, so the key point detector may detect only the second facial image.

606. The computer device generates first optical flow information based on the first position and the second position, the first optical flow information representing offsets of a plurality of key points in the first facial image and the second facial image.

Step 606 and step 404 belong to the same inventive concept, and no repeated description is provided here.

607. The computer device inputs the first optical flow information into an optical flow information prediction sub-model, and obtains second optical flow information through the optical flow information prediction sub-model based on the first optical flow information, the second optical flow information representing offsets between the plurality of pixels in the first facial image and the plurality of pixels in the second facial image.

Step 607 and step 405 belong to the same inventive concept, and no repeated description is provided here.

608. The computer device scales the second optical flow information to obtain third optical flow information with a same scale as the first intermediate feature map.

Step 608 and step 406 belong to the same inventive concept, and no repeated description is provided here.

609. The computer device inputs the third optical flow information into the generator, offsets pixels in the intermediate feature map through the generator based on the third optical flow information, and upsamples the offset intermediate feature map to obtain a predicted image of the facial image.

Step 609 and step 407 belong to the same inventive concept, and no repeated description is provided here.

610. If the second facial image is the last frame of the first video, the computer device generates a second video based on the generated predicted image.

In some embodiments, after obtaining any predicted image, the computer device performs image enhancement on the predicted image, and when generating the second video, a plurality of predicted image subjected to image enhancement is used for generation, to improve video quality.

The facial image is driven through the image processing model, so that the facial image may reflect the same and dynamic expression changes as a driving image, thereby achieving the purpose of diversifying image processing effects, and the effects of facial expressions are more realistic.

Figure 9:
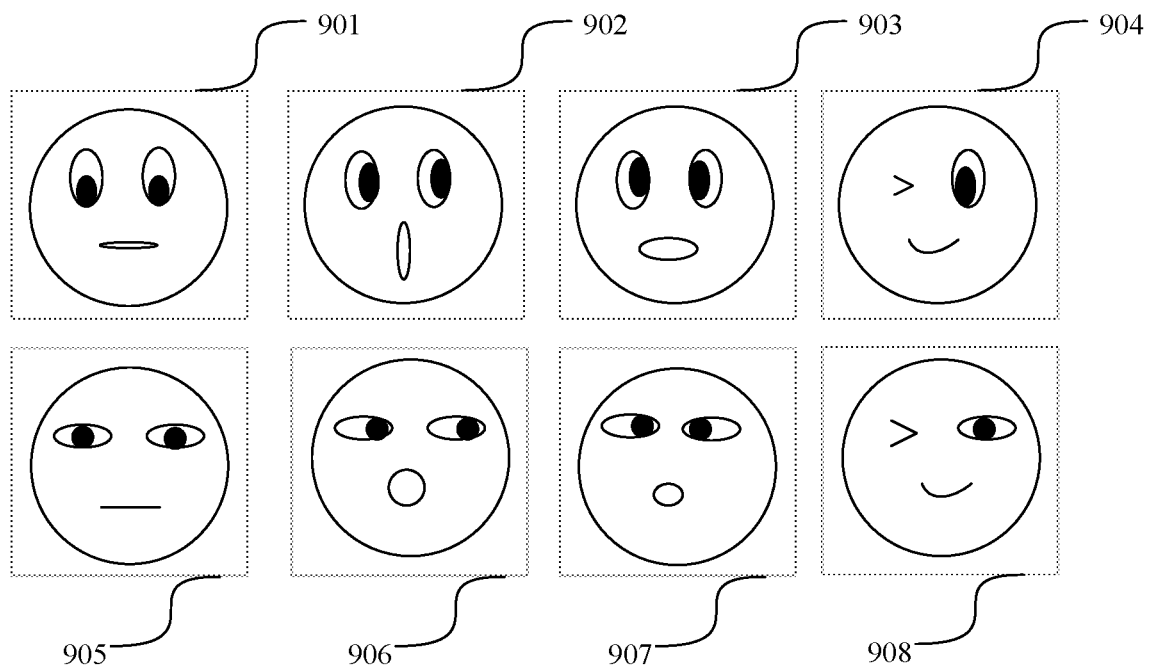
FIG. 9 is a schematic diagram of a generation result of a facial image according to an embodiment of the present disclosure.

Referring to FIG. 9, FIG. 9 shows the generation effect of the facial image. Assuming that the first video comprises four images in total, FIG. 901 is taken as the first facial image, and FIG. 902, FIG. 903 and FIG. 904 are taken as the second facial image in turn, FIG. 905 is driven, and FIG. 906, FIG. 907, and FIG. 908 are obtained accordingly. Expressions in FIG. 906, FIG. 907, and FIG. 908 are consistent with those in FIG. 902, FIG. 903, and FIG. 904, respectively. Expression changes in the second video generated based on FIG. 906, FIG. 907, and FIG. 908 are also consistent with the expression changes in FIG. 902, FIG. 903, and FIG. 904.

611. If the second facial image is not the last frame of the first video, the computer device updates the second facial image and repeats step 603 to step 609.

Figure 10:
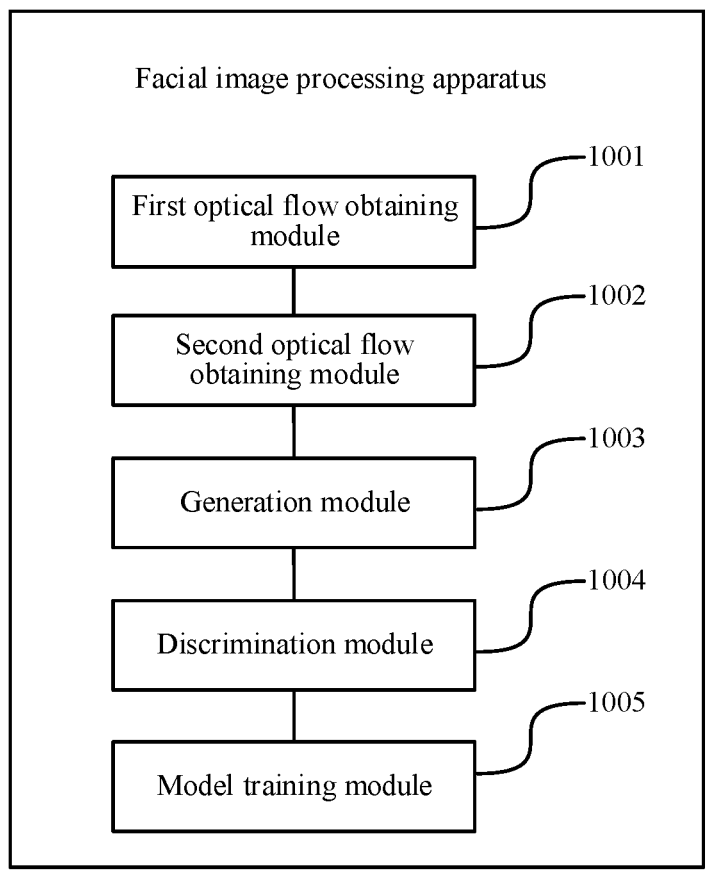
FIG. 10 is a schematic structural diagram of a facial image processing apparatus according to an embodiment of the present disclosure.

FIG. 10 is a schematic structural diagram of a facial image processing apparatus according to an embodiment of the present disclosure. Referring to FIG. 10, the apparatus includes: a first optical flow obtaining module 1001, a second optical flow obtaining module 1002, a generation module 1003, a discrimination module 1004, and a model training module 1005.

The first optical flow obtaining module 1001 is configured to obtain first optical flow information, the first optical flow information representing offsets of a plurality of key points of a face of a target object in a first facial sample image and a second facial sample image.

The second optical flow obtaining module 1002 is configured to obtain, based on the first optical flow information, second optical flow information through an optical flow information prediction sub-model of the image processing model, the second optical flow information representing offsets between a plurality of pixels in the first facial sample image and a plurality of corresponding pixels in the second facial sample image.

The generation module 1003 is configured to generate, based on the first facial sample image and the second optical flow information, a predicted image of the first facial sample image through a generator of the image processing model.

The discrimination module 1004 is configured to discriminate the predicted image and the second facial sample image through a discriminator of the image processing model to obtain a first discrimination result and a second discrimination result, the first discrimination result indicating whether the predicted image is a true sample image, and the second discrimination result indicating whether the second facial sample image is a true sample image; and The model training module 1005 is configured to train the image processing model based on the first discrimination result, the second discrimination result, the predicted image, the second facial sample image, the first optical flow information, and the second optical flow information.

In one embodiment, the generation module 1003 includes:
a predicted image generation unit, configured to: extract features of the first facial sample image through the generator to obtain the first intermediate feature map; scale the second optical flow information to obtain third optical flow information with a same scale as the first intermediate feature map; offset pixels in the first intermediate feature map based on the third optical flow information to obtain a second intermediate feature map; and upsample the second intermediate feature map to obtain the predicted image of the first facial sample image.

In one embodiment, a scaling unit is configured to:
scale down the second optical flow information based on a scale difference between the first intermediate feature map and the first facial sample image to obtain the third optical flow information.

In one embodiment, the model training module 1005 includes:
a first determining unit, configured to determine a function value of a total loss function based on the first discrimination result, the second discrimination result, the predicted image, the second facial sample image, the first optical flow information, and the second optical flow information;

an update unit, configured to update network parameters of the image processing model when the function value or a current iteration dose not satisfy a training stop condition, and perform the next iterative training based on the updated image processing model; and a second determining unit, configured to determine, when the function value or the current iteration satisfies the training stop condition, the image processing model corresponding to a current iteration process as a trained image processing model.

In one embodiment, a second processing unit is configured to:
scale down the second optical flow information based on the scale difference between the first intermediate feature map and the first facial sample image, and reduce the offset of each pixel in the scaled-down second optical flow information.

In one embodiment, the first determining unit is configured to:
obtain a first function value of a first branch function in the total loss function based on the first discrimination result and the second discrimination result, the first branch function representing discrimination accuracy of the discriminator for an input image;

obtain a second function value of a second branch function in the total loss function based on the predicted image and the second facial sample image, the second branch function representing a difference between the predicted image and the second facial sample image;

determine a third function value of a third branch function in the total loss function based on the first optical flow information and the second optical flow information, the third branch function representing prediction accuracy of the plurality of key points; and perform weighted summation on the first function value, the second function value, and the third function value to obtain the function value of the total loss function.

In one embodiment, the update unit is configured to perform one of the following operations:
when the first function value of the first branch function does not satisfy a first condition, keep the network parameters of the generator and the optical flow information prediction sub-model unchanged, update the network parameters of the discriminator in the image processing model, and perform the next iterative training based on the updated discriminator; and when the first function value of the first branch function satisfies the first condition, keep the network parameters of the discriminator unchanged, update the network parameters of the generator and the optical flow information prediction sub-model in the image processing model, and perform the next iterative training based on the updated generator and the updated optical flow information prediction sub-model.

When the facial image processing apparatus provided in the foregoing embodiments processes the facial image, only the division of the functional modules is taken as an example for illustration. In practical applications, the foregoing functions may be allocated to and completed by different functional modules according to requirements, that is, the inner structure of the computer device is divided into different functional modules to implement all or some of the functions described above. In addition, the facial image processing apparatus provided in the foregoing embodiments belongs to the same concept as the facial image processing method. See method embodiments for the details of the specific implementation process thereof, and the details are not described herein again.

Through the technical solution provided by the embodiment of the present disclosure, the second optical flow information capable of representing pixel offsets in a facial image is determined based on a plurality of key points of a face of a target object in the first facial sample image and the second facial sample image, to implement generative adversarial training based on the second optical flow information and an input sample image. Therefore, the image processing model can learn relevant features of the expression of the facial image, to achieve the purpose of driving the facial image to change the expression. The image processing model may be configured to drive any face, achieving the purpose of diversified image processing effects.

Figure 11:
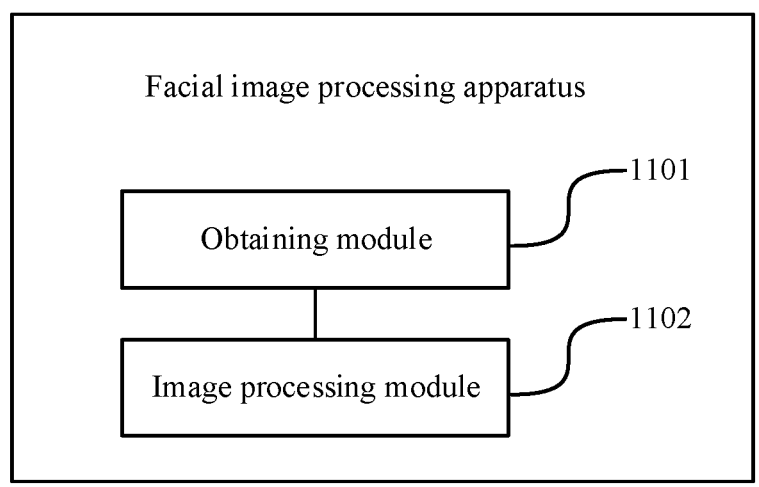
FIG. 11 is a schematic structural diagram of a facial image processing apparatus according to an embodiment of the present disclosure.

FIG. 11 is a schematic structural diagram of a facial image processing apparatus according to an embodiment of the present disclosure. Referring to FIG. 11, the apparatus includes: an obtaining module 1101 and an image processing module 1102.

The obtaining module 1101 is configured to obtain a facial image and a first video, the facial image being a facial image of a first object, the first video including a plurality of facial images of a second object, and expression changes existing between the plurality of facial images.

The image processing module 1102 is configure to process the facial image and the first video through an image processing model to obtain a second video, the second video including a plurality of facial images of the first object, and expression changes between the plurality of facial images of the first object are the same as the expression changes between the plurality of facial images in the first video.

The image processing model is obtained by adversarial training of second optical flow information between a first facial sample image, a second facial sample image, and a facial sample image of a same target object. The second optical flow information is used for representing offsets between a plurality of pixels in the first facial sample image and a plurality of corresponding pixels in the second facial sample image, and the second optical flow information is determined based on first optical flow information. The first optical flow information is used for representing offsets of a plurality of key points of a face of the target object in the first facial sample image and the second facial sample image.

When the facial image processing apparatus provided in the foregoing embodiments processes the facial image, only the division of the functional modules is taken as an example for illustration. In practical applications, the foregoing functions may be allocated to and completed by different functional modules according to requirements, that is, the inner structure of the computer device is divided into different functional modules to implement all or some of the functions described above. In addition, the facial image processing apparatus provided in the foregoing embodiments belongs to the same concept as the facial image processing method. See method embodiments for the details of the specific implementation process thereof, and the details are not described herein again.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 12:
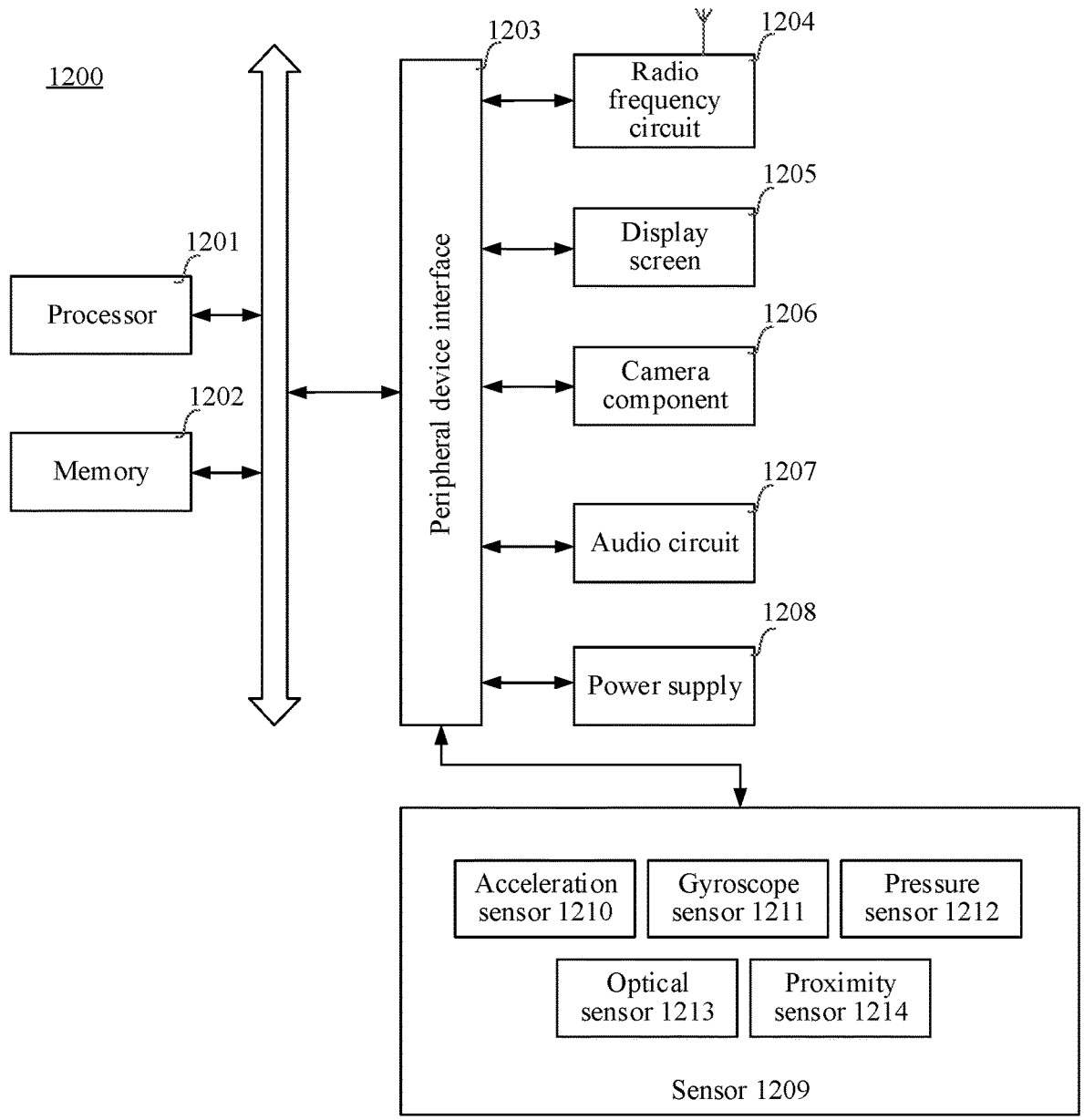
FIG. 12 is a schematic structural diagram of a terminal according to an embodiment of the present disclosure.

An embodiment of the present disclosure provides a computer device for performing the foregoing method. The computer device may be implemented as a terminal or a server, and the structure of the terminal is first introduced below:

FIG. 12 is a schematic structural diagram of a terminal according to an embodiment of the present disclosure. The terminal 1200 may be: a tablet computer, a notebook computer, or a desktop computer. The terminal 1200 may also be referred to as a terminal, a portable terminal, a laptop terminal, or a desktop terminal, and so on.

Generally, the terminal 1200 includes: one or more processors 1201 and one or more memories 1202.

The processor 1201 may include one or more processing cores, for example, a 4-core processor or an 8-core processor. In some embodiments, the processor 1201 may be integrated with a graphics processing unit (GPU). The GPU is configured to render and draw content that a display screen needs to display. In some embodiments, the processor 1201 may further include an AI processor. The AI processor is configured to process computing operations related to machine learning.

The memory 1202 may include one or more computer-readable storage media. The computer-readable storage media may be non-transient. In some embodiments, a non-transitory computer-readable storage medium in the memory 1202 is configured to store at least one computer program, and the at least one computer program is used for being executed by the processor 1201 to perform the facial image processing method according to the embodiments of the present disclosure.

In some embodiments, the terminal 1200 may include: a peripheral interface 1203 and at least one peripheral. The processor 1201, the memory 1202, and the peripheral interface 1203 may be connected through a bus or a signal cable. Each peripheral may be connected to the peripheral interface 1203 through a bus, a signal cable, or a circuit board. Specifically, the peripheral includes: at least one of a radio frequency circuit 1204, a display screen 1205, a camera component 1206, an audio circuit 1207, and a power supply 1208.

The peripheral interface 1203 may be configured to connect the at least one peripheral related to input/output (I/O) to the processor 1201 and the memory 1202. In some embodiments, the processor 1201, the memory 1202 and the peripheral device interface 1203 are integrated on a same chip or circuit board. In some other embodiments, any one or two of the processor 1201, the memory 1202, and the peripheral device interface 1203 may be implemented on a single chip or circuit board. This is not limited in this embodiment.

The radio frequency circuit 1204 is configured to receive and transmit an radio frequency (RF) signal, which is also referred to as an electromagnetic signal. The radio frequency circuit 1204 communicates with a communication network and other communication devices through the electromagnetic signal. The radio frequency circuit 1204 converts an electric signal into an electromagnetic signal for transmission, or converts a received electromagnetic signal into an electric signal.

The display screen 1205 is configured to display a user interface (UI). The UI may include a graph, text, an icon, a video, and any combination thereof. The camera component 1206 is configured to capture images or videos. In some embodiments, the camera component 1206 includes a front-facing camera and a rear-facing camera. Generally, the front-facing camera is disposed on a front panel of the terminal, and the rear-facing camera is disposed on a back surface of the terminal.

The audio circuit 1207 may include a microphone and a speaker. The microphone is configured to acquire sound waves of a user and an environment, and convert the sound waves into an electrical signal to input to the processor 1201 for processing, or input to the radio frequency circuit 1204 for implementing voice communication.

The power supply 1208 is configured to supply power to components in the terminal 1200. The power supply 1208 may be an alternating current, a direct current, a primary battery, or a rechargeable battery.

In some embodiments, the terminal 1200 further includes one or more sensors 1209. The one or more sensors 1209 include, but are not limited to: an acceleration sensor 1210, a gyroscope sensor 1211, a pressure sensor 1212, an optical sensor 1213, and a proximity sensor 1214.

The acceleration sensor 1210 may detect a magnitude of acceleration on three coordinate axes of a coordinate system established with the terminal 1200.

The gyroscope sensor 1211 may detect a body direction and a rotation angle of the terminal 1200. The gyroscope sensor 1211 may cooperate with the acceleration sensor 1210 to acquire a 3D action by the user on the terminal 1200.

The pressure sensor 1212 may be disposed at a side frame of the terminal 1200 and/or a lower layer of the display screen 1205. When the pressure sensor 1212 is disposed at the side frame of the terminal 1200, a holding signal of the user on the terminal 1200 may be detected. The processor 1201 performs left and right hand recognition or a quick operation according to the holding signal acquired by the pressure sensor 1212. The optical sensor 1213 is configured to acquire ambient light intensity. In an embodiment, the processor 1201 may control the display brightness of the touch display screen 1205 according to the ambient light intensity acquired by the optical sensor 1213.

The proximity sensor 1214 is configured to acquire a distance between the user and the front surface of the terminal 1200.

A person skilled in the art may understand that the structure shown in FIG. 12 constitutes no limitation on the terminal 1200, and the terminal may include more or fewer components than those shown in the figure, or some components may be combined, or a different component deployment may be used.

Figure 13:
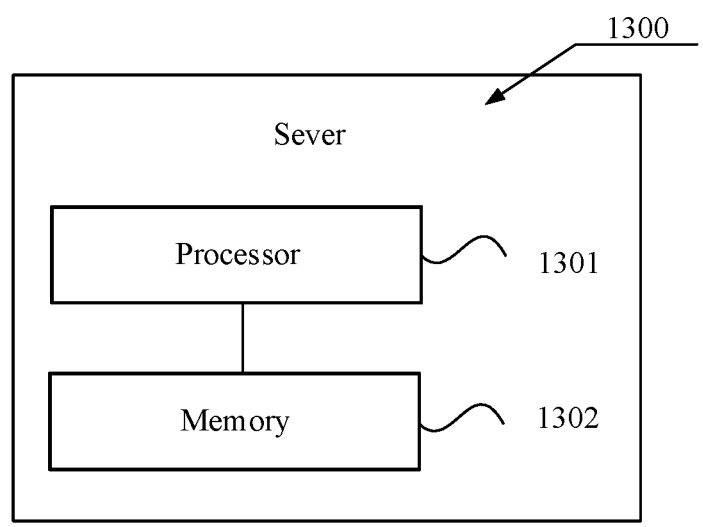
FIG. 13 is a schematic structural diagram of a server according to an embodiment of the present disclosure.

The computer device may also be implemented as a server, structure of the server is described below:

FIG. 13 is a schematic structural diagram of a server according to an embodiment of the present disclosure. The sever 1300 may vary a lot due to different configurations or performance, and may include one or more processors 1301 and one or more memories 1302. The one or more memories 1302 stores at least one computer program, the at least one computer program being loaded and executed by the one or more processors 1301 to perform the methods according to the foregoing embodiments. Certainly, the sever 1300 may further include components such as a wired or wireless network interface, a keyboard, and an input/output interface, to facilitate input and output. The sever 1300 may further include another component configured to implement a function of a device. Details are not further described herein.

In an exemplary embodiment, a computer-readable storage medium, such as a memory including a computer program, is further provided, and the computer program may be executed by a processor to complete the facial image processing method according to the foregoing embodiments. For example, the computer-readable storage medium may be a read-only memory (ROM), a random access memory (RAM), a compact disc read-only memory (CD-ROM), a magnetic tape, a floppy disk, an optical data storage device, etc.

In an exemplary embodiment, a computer program product or computer program is further provided. The computer program product or computer program includes a program code. The program code is stored in a computer-readable storage medium, a processor of a computer device reads the program code from the computer-readable storage medium, and the processor executes the program code to cause the computer device to perform the foregoing facial image processing method.

In some embodiments, the computer program involved in an embodiment of the present disclosure may be deployed on a computer device for execution, or executed on a plurality of computer devices located in one location, or, executed on a plurality of computer devices distributed in a plurality of locations and interconnected through a communication network, and the plurality of computer devices distributed in the plurality of locations and interconnected through the communication network may constitute a block chain system.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A facial image processing method, performed by a computer device and comprising:
   obtaining first optical flow information, the first optical flow information representing offsets of a plurality of key points of a target object in a first facial sample image and a second facial sample image;
   obtaining, based on the first optical flow information, second optical flow information through an optical flow information prediction sub-model of an image processing model, the second optical flow information representing offsets between a plurality of pixels in the first facial sample image and a plurality of corresponding pixels in the second facial sample image;

generating, based on the first facial sample image and the second optical flow information, a predicted image of the first facial sample image through a generator of the image processing model;

discriminating the predicted image and the second facial sample image through a discriminator of the image processing model to obtain a first discrimination result and a second discrimination result, the first discrimination result indicating whether the predicted image is a true sample image, and the second discrimination result indicating whether the second facial sample image is a true sample image; and training the image processing model based on the first discrimination result, the second discrimination result, the predicted image, the second facial sample image, the first optical flow information, and the second optical flow information.

2. The method according to claim 1, wherein the generating, based on the first facial sample image and the second optical flow information, a predicted image of the first facial sample image through a generator of the image processing model comprises:

extracting features of the first facial sample image through the generator to obtain a first intermediate feature map;

scaling the second optical flow information to obtain third optical flow information with a same scale as the first intermediate feature map;

offsetting pixels in the first intermediate feature map based on the third optical flow information to obtain a second intermediate feature map; and upsampling the second intermediate feature map to obtain the predicted image of the first facial sample image.

3. The method according to claim 2, wherein the scaling the second optical flow information to obtain third optical flow information with a same scale as the first intermediate feature map comprises:

scaling down the second optical flow information based on a scale difference between the first intermediate feature map and the first facial sample image to obtain the third optical flow information.

4. The method according to claim 1, wherein the training the image processing model based on the first discrimination result, the second discrimination result, the predicted image, the second facial sample image, the first optical flow information, and the second optical flow information comprises:

determining a function value of a total loss function based on the first discrimination result, the second discrimination result, the predicted image, the second facial sample image, the first optical flow information, and the second optical flow information;

updating network parameters of the image processing model when the function value or a current iteration dose not satisfy a training stop condition, and performing next iterative training based on the updated image processing model; and determining, when the function value or the current iteration satisfies the training stop condition, the image processing model corresponding to a current iteration process as a trained image processing model.

5. The method according to claim 4, wherein the determining a function value of a total loss function based on the first discrimination result, the second discrimination result, the predicted image, the second facial sample image, the first optical flow information, and the second optical flow information comprises:

obtaining a first function value of a first branch function in the total loss function based on the first discrimination result and the second discrimination result, the first branch function representing discrimination accuracy of the discriminator for an input image;

obtaining a second function value of a second branch function in the total loss function based on the predicted image and the second facial sample image, the second branch function representing a difference between the predicted image and the second facial sample image;

determining a third function value of a third branch function in the total loss function based on the first optical flow information and the second optical flow information, the third branch function representing prediction accuracy of the plurality of key points; and performing weighted summation on the first function value, the second function value, and the third function value to obtain the function value of the total loss function.

6. The method according to claim 5, wherein the updating network parameters of the image processing model when the function value or a current iteration dose not satisfy a training stop condition, and performing next iterative training based on the updated image processing model comprises:

when the first function value of the first branch function does not satisfy a first condition, keeping the network parameters of the generator and the optical flow information prediction sub-model unchanged, updating the network parameters of the discriminator in the image processing model, and performing the next iterative training based on the updated discriminator.

7. The method according to claim 5, wherein the updating network parameters of the image processing model when the function value or a current iteration dose not satisfy a training stop condition, and performing next iterative training based on the updated image processing model comprises:

when the first function value of the first branch function satisfies the first condition, keeping the network parameters of the discriminator unchanged, updating the network parameters of the generator and the optical flow information prediction sub-model in the image processing model, and performing the next iterative training based on the updated generator and the updated optical flow information prediction sub-model.

8. The method according to claim 1, further comprising:

obtaining a facial image and a first video, the facial image being a facial image of a first object, the first video comprising a plurality of facial images of a second object, and expression changes existing between the plurality of facial images; and processing the facial image and the first video through the trained image processing model to obtain a second video, the second video comprising a plurality of facial images of the first object, and expression changes between the plurality of facial images of the first object are the same as the expression changes between the plurality of facial images in the first video.

9. A facial image processing apparatus, comprising: one or more processors and one or more memories, the one or more memories storing at least one computer program, and the computer program being loaded and executed by the one or more processors to:

obtain first optical flow information, the first optical flow information representing offsets of a plurality of key points of a face of a target object in a first facial sample image and a second facial sample image;

obtain, based on the first optical flow information, second optical flow information through an optical flow information prediction sub-model of an image processing model, the second optical flow information representing offsets between a plurality of pixels in the first facial sample image and a plurality of corresponding pixels in the second facial sample image;

generate, based on the first facial sample image and the second optical flow information, a predicted image of the first facial sample image through a generator of the image processing model;

discriminate the predicted image and the second facial sample image through a discriminator of the image processing model to obtain a first discrimination result and a second discrimination result, the first discrimination result indicating whether the predicted image is a true sample image, and the second discrimination result indicating whether the second facial sample image is a true sample image; and train the image processing model based on the first discrimination result, the second discrimination result, the predicted image, the second facial sample image, the first optical flow information, and the second optical flow information.

10. The apparatus according to claim 9, wherein the one or more processors are further configured to:

extract features of the first facial sample image through the generator to obtain a first intermediate feature map;

scale the second optical flow information to obtain a third optical flow information with a same scale as the first intermediate feature map;

offset pixels in the first intermediate feature map based on the third optical flow information to obtain a second intermediate feature map; and upsample the second intermediate feature map to obtain the predicted image of the first facial sample image.

11. The apparatus according to claim 10, wherein the one or more processors are further configured to:

scale down the second optical flow information based on a scale difference between the first intermediate feature map and the first facial sample image to obtain the third optical flow information.

12. The apparatus according to claim 9, wherein the one or more processors are further configured to:

determine a function value of a total loss function based on the first discrimination result, the second discrimination result, the predicted image, the second facial sample image, the first optical flow information, and the second optical flow information;

update network parameters of the image processing model when the function value or a current iteration dose not satisfy a training stop condition, and perform next iterative training based on the updated image processing model; and determine, when the function value or the current iteration satisfies the training stop condition, the image processing model corresponding to a current iteration process as a trained image processing model.

13. The apparatus according to claim 12, wherein the one or more processors are further configured to:

obtain a first function value of a first branch function in the total loss function based on the first discrimination result and the second discrimination result, the first branch function representing discrimination accuracy of the discriminator for an input image;

obtain a second function value of a second branch function in the total loss function based on the predicted image and the second facial sample image, the second branch function representing a difference between the predicted image and the second facial sample image;

determine a third function value of a third branch function in the total loss function based on the first optical flow information and the second optical flow information, the third branch function representing prediction accuracy of the plurality of key points; and perform weighted summation on the first function value, the second function value, and the third function value to obtain the function value of the total loss function.

14. The apparatus according to claim 13, wherein the one or more processors are further configured to:

when the first function value of the first branch function does not satisfy a first condition, keep the network parameters of the generator and the optical flow information prediction sub-model unchanged, update the network parameters of the discriminator in the image processing model, and perform the next iterative training based on the updated discriminator.

15. The apparatus according to claim 13, wherein the one or more processors are further configured to:

when the first function value of the first branch function satisfies the first condition, keeping the network parameters of the discriminator unchanged, update the network parameters of the generator and the optical flow information prediction sub-model in the image processing model, and perform the next iterative training based on the updated generator and the updated optical flow information prediction sub-model.

16. The apparatus according to claim 9, wherein the one or more processors are further configured to:

obtain a facial image and a first video, the facial image being a facial image of a first object, the first video comprising a plurality of facial images of a second object, and expression changes existing between the plurality of facial images; and process the facial image and the first video through the trained image processing model to obtain a second video, the second video comprising a plurality of facial images of the first object, and expression changes between the plurality of facial images of the first object are the same as the expression changes between the plurality of facial images in the first video.

17. A non-transitory computer-readable storage medium, storing at least one computer program, and the computer program being loaded and executed by a processor to implement:

obtaining first optical flow information, the first optical flow information representing offsets of a plurality of key points of a target object in a first facial sample image and a second facial sample image;

obtaining, based on the first optical flow information, second optical flow information through an optical flow information prediction sub-model of an image processing model, the second optical flow information representing offsets between a plurality of pixels in the first facial sample image and a plurality of corresponding pixels in the second facial sample image;

generating, based on the first facial sample image and the second optical flow information, a predicted image of the first facial sample image through a generator of the image processing model;

discriminating the predicted image and the second facial sample image through a discriminator of the image processing model to obtain a first discrimination result and a second discrimination result, the first discrimination result indicating whether the predicted image is a true sample image, and the second discrimination result indicating whether the second facial sample image is a true sample image; and training the image processing model based on the first discrimination result, the second discrimination result, the predicted image, the second facial sample image, the first optical flow information, and the second optical flow information.

18. The storage medium according to claim 17, wherein the generating, based on the first facial sample image and the second optical flow information, a predicted image of the first facial sample image through a generator of the image processing model comprises:

extracting features of the first facial sample image through the generator to obtain a first intermediate feature map;

scaling the second optical flow information to obtain third optical flow information with a same scale as the first intermediate feature map;

offsetting pixels in the first intermediate feature map based on the third optical flow information to obtain a second intermediate feature map; and upsampling the second intermediate feature map to obtain the predicted image of the first facial sample image.

19. The storage medium according to claim 18, wherein the scaling the second optical flow information to obtain third optical flow information with a same scale as the first intermediate feature map comprises:

scaling down the second optical flow information based on a scale difference between the first intermediate feature map and the first facial sample image to obtain the third optical flow information.

20. The storage medium according to claim 17, wherein the training the image processing model based on the first discrimination result, the second discrimination result, the predicted image, the second facial sample image, the first optical flow information, and the second optical flow information comprises:

determining a function value of a total loss function based on the first discrimination result, the second discrimination result, the predicted image, the second facial sample image, the first optical flow information, and the second optical flow information;

updating network parameters of the image processing model when the function value or a current iteration dose not satisfy a training stop condition, and performing next iterative training based on the updated image processing model; and determining, when the function value or the current iteration satisfies the training stop condition, the image processing model corresponding to a current iteration process as a trained image processing model.

* * * * *